(12) United States Patent
Gomes et al.

(10) Patent No.: US 12,471,288 B2
(45) Date of Patent: Nov. 11, 2025

(54) THREE-DIMENSIONAL NANORIBBON-BASED HYSTERETIC MEMORY

(71) Applicant: Intel Corporation, Santa Clara, CA (US)

(72) Inventors: Wilfred Gomes, Portland, OR (US); Uygar E. Avci, Portland, OR (US); Abhishek A. Sharma, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 17/543,809

(22) Filed: Dec. 7, 2021

(65) Prior Publication Data

US 2023/0180482 A1    Jun. 8, 2023

(51) Int. Cl.
*H10B 53/20*      (2023.01)
*H10B 53/10*      (2023.01)
(Continued)

(52) U.S. Cl.
CPC .............. *H10B 53/20* (2023.02); *H10B 53/10* (2023.02); *H10D 30/6713* (2025.01);
(Continued)

(58) Field of Classification Search
CPC ........ H10B 53/20; H10B 53/10; H10B 51/10; H10B 53/30; H10B 51/30; H10D 30/6713;
(Continued)

(56) References Cited

U.S. PATENT DOCUMENTS 6,163,482 A    12/2000 Chi
7,092,288 B2    8/2006 Lojek
(Continued)

FOREIGN PATENT DOCUMENTS

CN    109616474 A    4/2019
EP    3534401 A2    9/2019
(Continued)

OTHER PUBLICATIONS

Anil, D.G., et al., "Performance Evaluation of Ternary Computation in SRAM Design Using Graphene Nanoribbon Field Effect Transistors," IEEE 8th Annual Computing and Communication Workshop and Conference (CCWC), Las Vegas, NV, pp. 382-388 (2018).
(Continued)

*Primary Examiner* — Christine S. Kim
*Assistant Examiner* — Nathalie R Fayette
(74) *Attorney, Agent, or Firm* — Akona IP PC

(57) ABSTRACT

Three-dimensional hysteretic memory based on semiconductor nanoribbons is disclosed. An example memory cell may include a nanoribbon-based access transistor and a capacitor coupled to the access transistor, where the capacitor at least partially wraps around the nanoribbon in which the access transistor is formed. One or both of a gate stack of the access transistor and the capacitor insulator may include a hysteretic material/arrangement. Plurality of such memory cells may be provided in a single nanoribbon, and the nanoribbon may be one of a stack of nanoribbons provided above one another over a support structure. Incorporating hysteretic memory cells in different layers above a support structure by using stacks of semiconductor nanoribbons may allow significantly increasing density of hysteretic memory cells in a memory array having a given footprint area, or conversely, significantly reducing the footprint area
(Continued)

of the memory array with a given density of hysteretic memory cells.

20 Claims, 18 Drawing Sheets

(51) Int. Cl.
*H10D 30/67* (2025.01)
*H10D 62/10* (2025.01)
(52) U.S. Cl.
CPC ..... *H10D 30/6735* (2025.01); *H10D 30/6757* (2025.01); *H10D 62/118* (2025.01)
(58) Field of Classification Search
CPC ........... H10D 30/6735; H10D 30/6757; H10D 62/118; H10D 1/66; H10D 1/68; G11C 11/221; G11C 11/223
See application file for complete search history.

(56) References Cited

U.S. PATENT DOCUMENTS

| | | | |
|---|---|---|---|
| 7,701,751 | B2 | 4/2010 | Kang et al. |
| 7,804,702 | B2 | 9/2010 | Madan |
| 8,178,862 | B2 | 5/2012 | Colinge |
| 8,687,399 | B2 | 4/2014 | Sekar et al. |
| 9,640,509 | B1 | 5/2017 | Yang |
| 10,937,783 | B2* | 3/2021 | Chang et al. .......... H10B 51/30 |
| 11,018,264 | B1 | 5/2021 | Gomes et al. |
| 11,056,492 | B1 | 7/2021 | Gomes et al. |
| 11,087,832 | B1 | 8/2021 | Gomes et al. |
| 11,139,300 | B2 | 10/2021 | Gomes et al. |
| 11,171,145 | B2 | 11/2021 | Chang et al. |
| 11,257,822 | B2* | 2/2022 | Gomes et al. ..... H10D 30/6713 |
| 11,502,084 | B2 | 11/2022 | Shin et al. |
| 2002/0036313 | A1 | 3/2002 | Yang et al. |
| 2006/0084204 | A1 | 4/2006 | Yin et al. |
| 2009/0010055 | A1 | 1/2009 | Kang et al. |
| 2009/0303801 | A1 | 12/2009 | Kim |
| 2010/0295102 | A1 | 11/2010 | Sankin et al. |
| 2012/0273747 | A1 | 11/2012 | Saitoh et al. |
| 2014/0054538 | A1 | 2/2014 | Park |
| 2015/0035568 | A1 | 2/2015 | Peng et al. |
| 2015/0162336 | A1 | 6/2015 | Kim et al. |
| 2015/0340372 | A1* | 11/2015 | Pandey et al. ........ H10D 64/033 257/295 |
| 2016/0197069 | A1 | 7/2016 | Morrow et al. |
| 2017/0103988 | A1 | 4/2017 | Nishida et al. |
| 2017/0256552 | A1 | 9/2017 | Schröder et al. |
| 2017/0287905 | A1 | 10/2017 | Morrow et al. |
| 2018/0323199 | A1 | 11/2018 | Roberts et al. |
| 2019/0006376 | A1 | 1/2019 | Ramaswamy |
| 2019/0074277 | A1 | 3/2019 | Ramaswamy |
| 2019/0103406 | A1 | 4/2019 | Tang et al. |
| 2019/0164985 | A1 | 5/2019 | Lee et al. |
| 2019/0189357 | A1 | 6/2019 | Chavan et al. |
| 2019/0287908 | A1 | 9/2019 | Dogiamis et al. |
| 2019/0305135 | A1 | 10/2019 | Radosavljevic et al. |
| 2020/0091156 | A1* | 3/2020 | Sharma et al. ........ H10B 12/01 |
| 2020/0098756 | A1* | 3/2020 | Lilak et al. ............ H10D 62/83 |
| 2020/0127142 | A1 | 4/2020 | Dewey et al. |
| 2020/0194443 | A1 | 6/2020 | Lin et al. |
| 2020/0227416 | A1 | 7/2020 | Lilak et al. |
| 2020/0259018 | A1 | 8/2020 | Rami et al. |
| 2020/0273867 | A1 | 8/2020 | Manipatruni et al. |
| 2020/0279601 | A1* | 9/2020 | Kim et al. ............. H10B 12/30 |
| 2020/0286984 | A1 | 9/2020 | Chang et al. |
| 2020/0373312 | A1* | 11/2020 | Sharma et al. ........ H10D 86/60 |
| 2021/0028231 | A1 | 1/2021 | Andrieu et al. |
| 2021/0036144 | A1 | 2/2021 | Liaw |
| 2021/0125990 | A1 | 4/2021 | Gomes et al. |
| 2021/0134802 | A1 | 5/2021 | Gomes et al. |
| 2021/0151438 | A1 | 5/2021 | Gomes et al. |
| 2021/0159229 | A1 | 5/2021 | Gomes et al. |
| 2021/0184052 | A1 | 6/2021 | Gomes et al. |
| 2021/0193666 | A1 | 6/2021 | Gomes et al. |
| 2021/0210601 | A1 | 7/2021 | Pidin |
| 2021/0272624 | A1 | 9/2021 | Gomes et al. |
| 2021/0305250 | A1 | 9/2021 | Yang et al. |
| 2021/0335791 | A1 | 10/2021 | Gomes et al. |
| 2021/0375926 | A1 | 12/2021 | Mehandru et al. |
| 2021/0398991 | A1 | 12/2021 | Manfrini et al. |
| 2022/0045065 | A1 | 2/2022 | Gomes et al. |
| 2022/0068931 | A1 | 3/2022 | Gomes et al. |
| 2023/0253033 | A1 | 8/2023 | Ramaraju |

FOREIGN PATENT DOCUMENTS

| | | |
|---|---|---|
| TW | 1734112 | 5/2019 |
| TW | 202119594 | 5/2021 |
| WO | 2018125024 A1 | 7/2018 |
| WO | 2018208719 A1 | 11/2018 |
| WO | 2021112247 A1 | 6/2021 |

OTHER PUBLICATIONS

Hsieh, E.R., et al., "A Novel Architecture to Build Ideal-linearity Neuromorphic Synapses on a Pure Logic FinFET Platform Featuring 2.5ns PGM-time and 1012 Endurance," 2019 Symposium on VLSI Technology Digest of Technical Papers; 2 pages.
Joshi, S., et al., "Graphene Nanoribbon Field Effect Transistor Based Ultra-Low Energy SRAM Design," IEEE International Symposium on Nanoelectronic and Information Systems (iNIS), Gwalior, pp. 76-79 (2016).
Khasanvis, S., et al., "Low-Power Heterogeneous Graphene Nanoribbon-CMOS Multistate Volatile Memory Circuit," 17 pages.
Rabieefar, et al., "Utilizing Graphene Nano-Ribbon Transistor in Data Converters: A Comparative Study," ECS Journal of Solid State Science and Technology, 8; M30-M37 (2019).
Trombini, H., et al., "Unraveling structural and compositional information in 3D FinFET electronic devices," Nature.com/Scientific Reports; 7 pages (Aug. 12, 2019).
Xu, C., et al., "Modeling, Analysis, and Design of Graphene Nano-Ribbon Interconnects," IEEE Transaction on Electron Devices; vol. 56, No. 8; pp. 1567-1578 (Aug. 2009).
Chang et al., "A Thermodynamic Perspective of Negative-Capacitance Field-Effect Transistors" IEEE Journal on Exploratory Solid-State Computational Devices and Circuits; vol. 3; 9 pages (2017).
Chang et al., "Inversion Charge Boost and Transient Steep-Slope Induced by Free-Charge-Polarization Mismatch in a Ferroelectric-Metal-Oxide-Semiconductor Capacitor," IEEE Journal on Exploratory Solid-State Computational Devices and Circuits; vol. 4, No. 2; 6 pages (Dec. 2018).
Chang et al., "Physical Origin of Transient Negative Capacitance in a Ferroelectric Capacitor," Physical Review Applied 9; 8 pages (2018).
U.S. Appl. No. 15/994,227, filed May 31, 2018 entitled "Anti-Ferroelectric Capacitor Memory Cell.".
U.S. Appl. No. 16/296,085, filed Mar. 7, 2019 entitled "Ultra-Dense Ferroelectric Memory With Self-Aligned Patterning.".

* cited by examiner

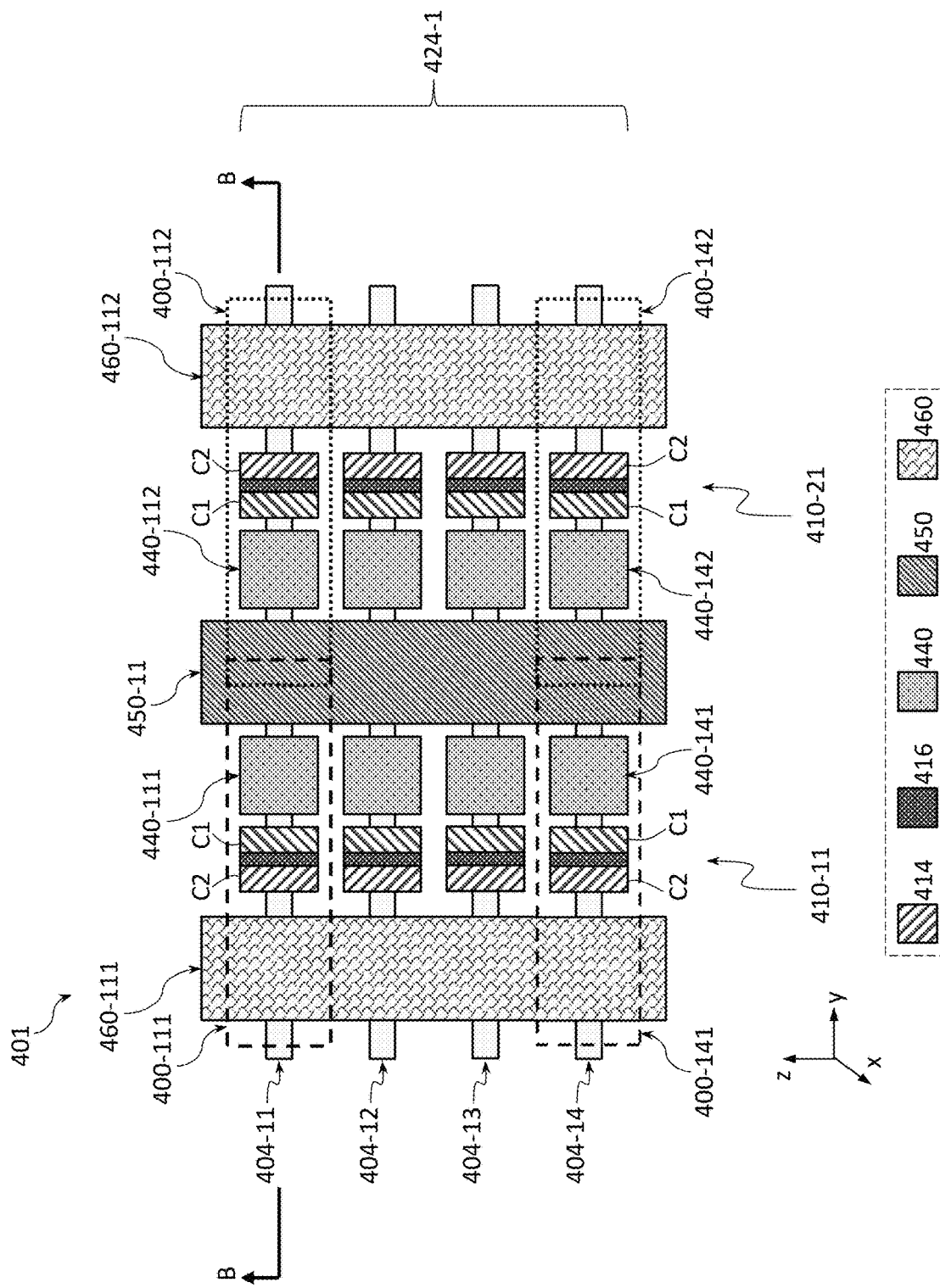

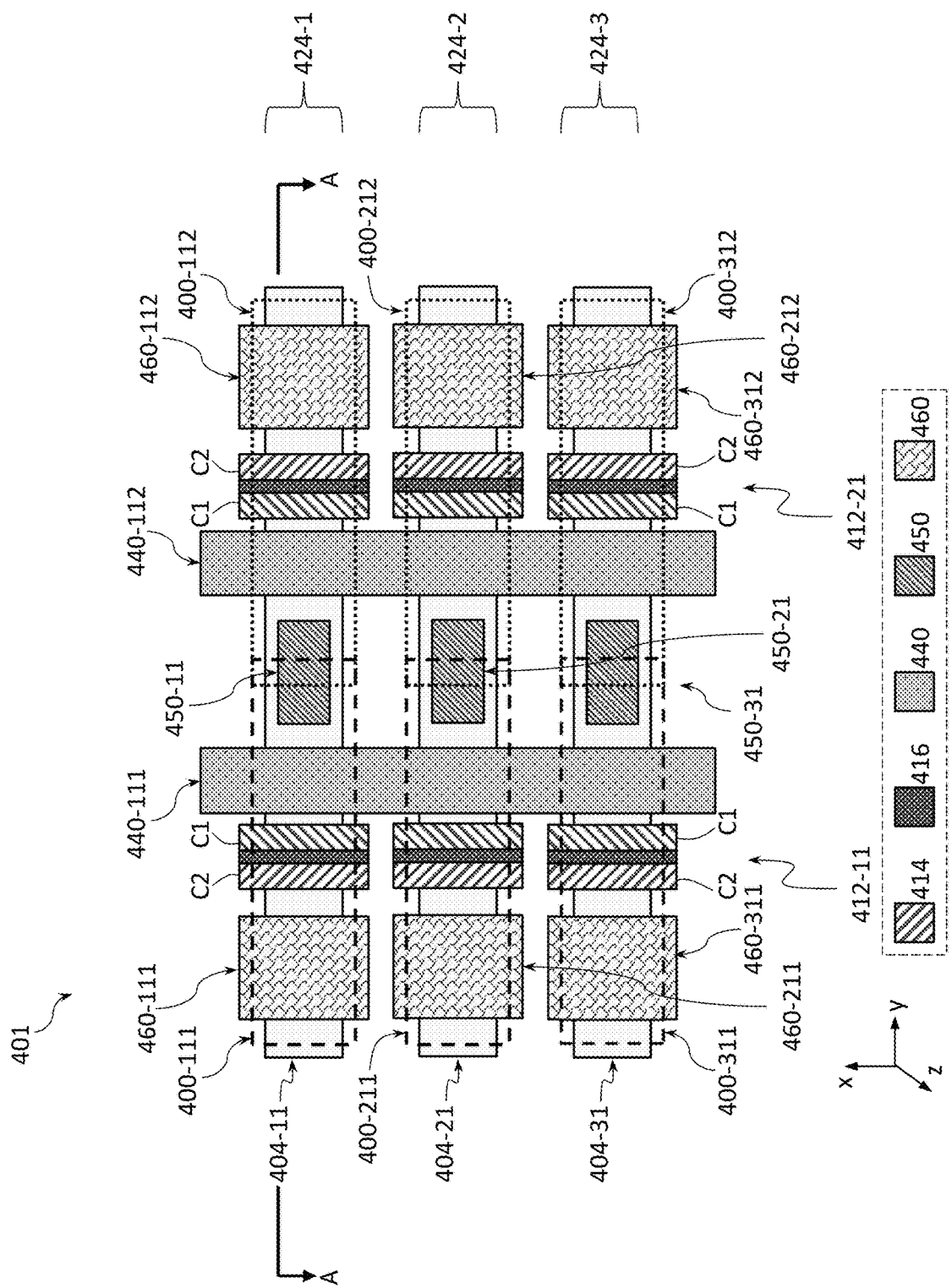

THREE-DIMENSIONAL NANORIBBON-BASED HYSTERETIC MEMORY

BACKGROUND

Embedded memory is important to the performance of modern system-on-a-chip (SoC) technology. Low power and high-density embedded memory is used in many different computer products and further improvements are always desirable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 4A-4H illustrate example layouts of an integrated circuit (IC) device implementing three-dimensional (3D) nanoribbon-based hysteretic memory, according to some embodiments of the present disclosure.

DETAILED DESCRIPTION

Figure 1A:
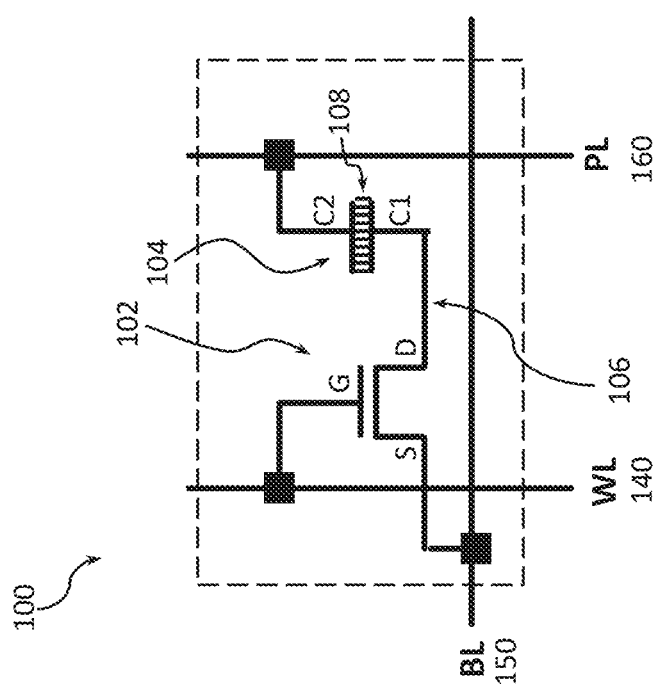
FIGS. 1A-1C provide schematic illustrations of different hysteretic memory cells, according to some embodiments of the present disclosure.

Described herein are hysteretic memory arrangements and corresponding methods and devices. Hysteretic memory refers to a memory technology employing hysteretic materials or arrangements, where a material or an arrangement may be described as hysteretic if it exhibits the dependence of its state on the history of the material (e.g., on a previous state of the material). Ferroelectric (FE) and antiferroelectric (AFE) materials are one example of hysteretic materials. Layers of different materials arranged in a stack to exhibit charge-trapping phenomena is one example of a hysteretic arrangement.

An FE or an AFE material is a material that exhibits, over some range of temperatures, spontaneous electric polarization, i.e., displacement of positive and negative charges from their original position, where the polarization can be reversed or reoriented by application of an electric field. In particular, an AFE material is a material that can assume a state in which electric dipoles from the ions and electrons in the material may form a substantially ordered (e.g., substantially crystalline) array, with adjacent dipoles being oriented in opposite (antiparallel) directions (i.e., the dipoles of each orientation may form interpenetrating sub-lattices, loosely analogous to a checkerboard pattern), while an FE material is a material that can assume a state in which all of the dipoles point in the same direction. Because the displacement of the charges in FE and AFE materials can be maintained for some time even in the absence of an electric field, such materials may be used to implement memory cells. Because the current state of the electric dipoles in FE and AFE materials depends on the previous state, such materials are hysteretic materials. Memory technology where logic states are stored in terms of the orientation of electric dipoles in (i.e., in terms of polarization of) FE or AFE materials is referred to as "FE memory," where the term "ferroelectric" is said to be adopted to convey the similarity of FE memories to ferromagnetic memories, despite the fact that there is typically no iron (Fe) present in FE or AFE materials.

A stack of alternating layers of materials that is configured to exhibit charge-trapping is an example of a hysteretic arrangement. Such a stack may include as little as two layers of materials, one of which is a charge-trapping layer (i.e., a layer of a material configured to trap charges when a volage is applied across the material) and the other one of which is a tunnelling layer (i.e., a layer of a material through which the charge is to be tunneled to the charge-trapping layer). The tunnelling layer may include an insulator material such as a material that includes silicon and oxygen (e.g., silicon oxide), or any other suitable insulator. The charge-trapping layer may include a metal or a semiconductor material that is configured to trap charges. For example, a material that includes silicon and nitrogen (e.g., silicon nitride) may be used in/as a charge-trapping layer. Because the trapped charges may be kept in a charge-trapping arrangement for some time even in the absence of an electric field, such arrangements may be used to implement memory cells. Because the presence and/or the amount of trapped charges in a charge-trapping arrangement depends on the previous state, such arrangements are hysteretic arrangements. Memory technology where logic states are stored in terms of the amount of charge trapped in a hysteretic arrangement may be referred to as "charge-trapping memory."

Hysteretic memories have the potential for adequate non-volatility, short programming time, low power consumption, high endurance, and high speed writing. In addition, hysteretic memories may be manufactured using processes compatible with the standard complementary metal-oxide-semiconductor (CMOS) technology. Therefore, over the last few years, these types of memories have emerged as promising candidates for many growing applications.

The performance of a hysteretic memory cell may depend on the number of factors. One factor is the ability of a cell to prevent or minimize detrimental effects of voltages which may unintentionally disturb a polarization state or a trapped charge that the cell is supposed to hold. Unlike ferromagnetic cores which have square-like hysteresis loops with sharp transitions around their coercive points, as is desirable for memory implementations, hysteresis loops of hysteretic materials/arrangements may not always have sharp transitions which means that even relatively small voltages can inadvertently disturb their polarization states. One approach to address this issue could be to improve processing techniques for creating hysteretic materials/arrangements in an attempt to realize square-like hysteresis loops. Another approach is to overcome this shortcoming of the materials by employing creative circuit architectures, e.g., by using access transistors to control access to hysteretic memory cells.

Various hysteretic memory cells have, conventionally, been implemented with access transistors being front-end of line (FEOL), logic-process based, transistors implemented in an upper-most layer of a semiconductor substrate. Inventors of the present disclosure realized that using conventional FEOL transistors creates several challenges for increasing density of hysteretic memory.

One challenge resides in that, given a usable surface area of a substrate, there are only so many FEOL transistors that can be formed in that area, placing a significant limitation on the density of memory cells incorporating such transistors. In conventional solutions, attempts to increase memory density have included decreasing the critical dimensions of the memory cells, which requires ever-increasing process complexity and cost, resulting in diminishing returns and expected slow pace of memory scaling for future nodes.

Embodiments of the present disclosure may improve on at least some of the challenges and issues described above by increasing the number of active memory layers, to generate a vertically-stacked hysteretic memory using fewer masks and at a lower cost. In particular, embodiments of the present disclosure are based on using semiconductor nanoribbons stacked above one another to realize high-density hysteretic memory. In the context of the present disclosure, the term "above" may refer to being further away from a support structure (e.g., a substrate, a die, a wafer, or a chip) of an IC device, while the term "below" refers to being closer towards the support structure. Furthermore, as used herein, the term "nanoribbon" refers to an elongated semiconductor structure having a longitudinal axis parallel to the support structure over which a memory device is provided. Typically, a length of a such a structure (i.e., a dimension measured along the longitudinal axis, shown in the present drawings to be along the y-axis of an example x-y-z coordinate system) is greater than each of a width (i.e., a dimension measured along the x-axis of the example coordinate system shown in the present drawings) and a thickness/height (i.e., a dimension measured along the z-axis of the example coordinate system shown in the present drawings). In some settings, the terms "nanoribbon" or "nanosheet" have been used to describe elongated semiconductor structures that have a rectangular transverse cross-section (i.e., a cross-section in a plane perpendicular to the longitudinal axis of the structure), while the term "nanowire" has been used to describe similar elongated structures but with circular transverse cross-sections. In the present disclosure, the term "nanoribbon" is used to refer to all such nanowires, nanoribbons, and nanosheets, as well as elongated semiconductor structures with a longitudinal axis parallel to the support structures and with having transverse cross-sections of any geometry (e.g., transverse cross-sections in the shape of an oval or a polygon with rounded corners). A transistor may then be described as a "nanoribbon-based transistor" if the channel of the transistor is a portion of a nanoribbon, i.e., a portion around which a gate stack of a transistor may wrap around. The semiconductor material in the portion of the nanoribbon that forms a channel of a transistor may be referred to as a "channel material," with source and drain (S/D) regions of a transistor provided on either side of the channel material.

3D hysteretic memory based on semiconductor nanoribbons stacked above one another is disclosed. An example memory cell may include a nanoribbon-based access transistor and a capacitor that is coupled to a source or a drain region of the access transistor and has a first capacitor electrode, a second capacitor electrode, and a capacitor insulator that at least partially wraps around the nanoribbon in which the access transistor is formed. One or both of a gate stack of the access transistor and the capacitor insulator may include a hysteretic material/arrangement, thus making the memory cell a hysteretic memory cell, where either a polarization state of a hysteretic material or a charge-trapping state of a hysteretic arrangement may be used for storing a memory state (e.g., logical "1" or "0"). Plurality of such memory cells may be provided in a single nanoribbon, and the nanoribbon may be one of a stack of nanoribbons provided above one another over a support structure. Incorporating hysteretic memory cells in different layers above a support structure by using stacks of semiconductor nanoribbons may allow significantly increasing density of hysteretic memory cells in a memory array having a given footprint area (the footprint area being defined as an area in a plane of the support structure, or a plane parallel to the plane of the support structure, i.e., the x-y plane of the example coordinate system shown in the present drawings), or, conversely, allow significantly reducing the footprint area of the memory array with a given density of hysteretic memory cells. IC devices implementing stacked 3D nanoribbon-based hysteretic memory as described herein may be used to address the scaling challenges of conventional (e.g., FEOL) 1T-1C memory technology and enable high-density embedded memory compatible with advanced CMOS processes. Other technical effects will be evident from various embodiments described here.

As used herein, a "memory state" (or, alternatively, a "logic state," a "state," or a "bit" value) of a memory cell refers to one of a finite number of states that the cell can have, e.g., logic states "1" and "0." When any of the memory cells as described herein use a hysteretic material such as an FE or an AFE material, in some embodiments, a logic state of the memory cell may be represented simply by presence or absence of polarization of an FE or an AFE material in a certain direction (for example, for a two-state memory where a memory cell can store one of only two logic states—one logic state representing the presence of polarization in a certain direction and the other logic state representing the absence of polarization in a certain direction). In other embodiments of memory cells that include hysteretic materials such as FE or AFE materials, a logic state of a memory cell may be represented by the amount of polarization of an FE or an AFE material in a certain direction (for a multi-state memory where a memory cell can store one of three or more logic states, where different logic states represent the presence of different amounts of polarization in a certain direction). When any of the memory cells as described herein use a charge-trapping hysteretic arrangement, in some embodiments, a logic state of a memory cell may be represented simply by presence or absence of charge trapped in a charge-trapping hysteretic arrangement (for example, for a two-state memory where a memory cell can store one of only two logic states—one logic state representing the presence of charge and the other logic state representing the absence of charge). In other embodiments of memory cells that include charge-trapping hysteretic arrangements, a logic state of a memory cell may be represented by the amount charge trapped in a charge-trapping hysteretic arrangement (for example, for a multi-state memory where a memory cell can store one of three or more logic states, where different logic states represent the presence of different amounts of trapped charges). As used herein, "READ" and "WRITE" memory access or operations refer to, respectively, determining/sensing a logic state of a memory cell and programming/setting a logic state of a memory cell.

In the following, some descriptions may refer to a particular S/D region or contact being either a source region/contact or a drain region/contact. However, unless specified otherwise, which region/contact of a transistor is considered to be a source region/contact and which region/contact is considered to be a drain region/contact is not important because, as is common in the field of FETs, designations of source and drain are often interchangeable. Therefore, descriptions of some illustrative embodiments of the source and drain regions/contacts provided herein are applicable to embodiments where the designation of source and drain regions/contacts may be reversed. Furthermore, although descriptions of the present disclosure may refer to logic devices or memory cells provided in a given layer, each layer of the IC devices described herein may also include other types of devices besides logic or memory devices described herein. For example, in some embodiments, IC devices with 3D nanoribbon-based hysteretic memory cells may also include non-hysteretic memory cells, or any other type of memory cells, in any of the layers.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. If used, the terms "oxide," "carbide," "nitride," etc. refer to compounds containing, respectively, oxygen, carbon, nitrogen, etc., the term "high-k dielectric" refers to a material having a higher dielectric constant (k) than silicon oxide, while the term "low-k dielectric" refers to a material having a lower k than silicon oxide. The terms "substantially," "close," "approximately," "near," and "about," generally refer to being within +/−20%, e.g., within +/−5% or within +/−2%, of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For convenience, if a collection of drawings designated with different letters are present, e.g., FIGS. 4A-4H, such a collection may be referred to herein without the letters, e.g., as "FIG. 4." Similarly, if analogous elements are designated in the present drawings with different letters, e.g., memory cells 100A, 100B, and 100C, such elements may be referred to together without the letters, e.g., as "memory cells 100."

In the drawings, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using e.g., scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication. Inspection of layout and mask data and reverse engineering of parts of a device to reconstruct the circuit using e.g., optical microscopy, TEM, or SEM, and/or inspection of a cross-section of a device to detect the shape and the location of various device elements described herein using, e.g., Physical Failure Analysis (PFA) would allow determination of presence of IC devices with 3D nanoribbon-based hysteretic memory as described herein.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Various IC devices with 3D nanoribbon-based hysteretic memory cells as described herein may be implemented in, or associated with, one or more components associated with an IC or/and may be implemented between various such components. In various embodiments, components associated with an IC include, for example, transistors, diodes, power sources, resistors, capacitors, inductors, sensors, transceivers, receivers, antennas, etc. Components associated with an IC may include those that are mounted on IC or those connected to an IC. The IC may be either analog or digital and may be used in a number of applications, such as microprocessors, optoelectronics, logic blocks, audio amplifiers, etc., depending on the components associated with the IC. The IC may be employed as part of a chipset for executing one or more related functions in a computer.

Figure 1B:
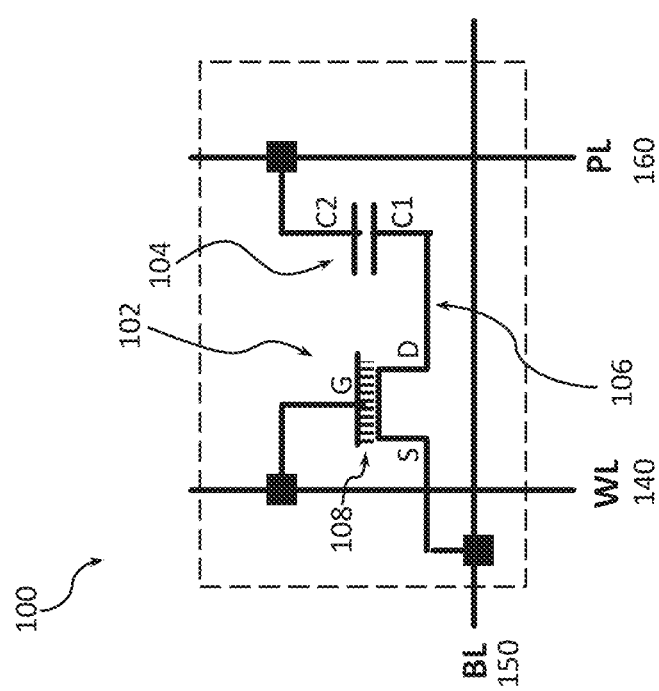
Figure 1C:
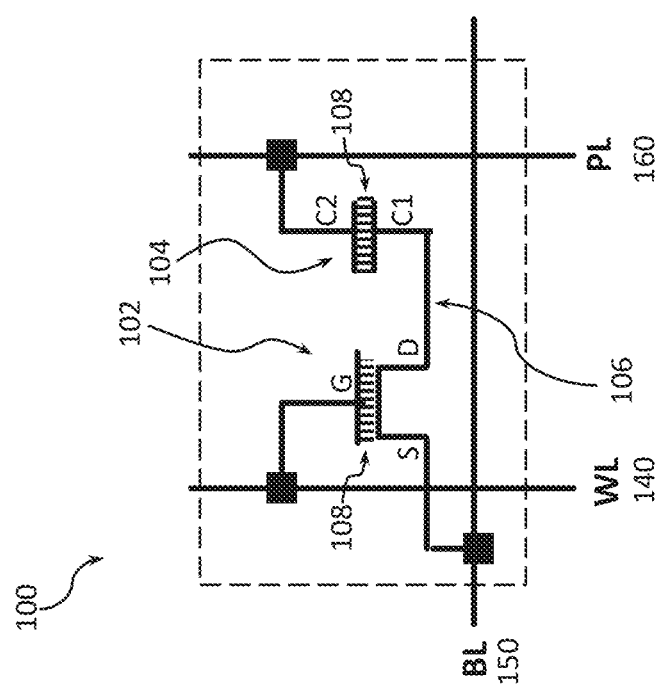

FIGS. 1A-1C provide schematic illustrations of different hysteretic memory cells 100, according to some embodiments of the present disclosure. Each of the memory cells 100 shown in FIGS. 1A-1C has one access transistor 102 and one capacitor 104, coupled to the access transistor 102. The memory cells 100 differ from one another in where hysteretic materials/arrangements are implemented to make these memory cells hysteretic memory cells.

As shown in FIG. 1, the access transistor 102 may be a FET, having a gate terminal, a source terminal, and a drain terminal, labeled in the example of FIG. 1 as terminals G, S, and D, respectively. As further shown in FIG. 1, the gate terminal of the access transistor 102 may be coupled to a wordline (WL) 140, one of the source or drain regions (e.g., a first S/D region) of the access transistor 102 may be coupled to a bitline (BL) 150, and the other one of the source or drain regions (e.g., a second S/D region) of the access transistor 102 may be coupled to a first capacitor electrode of the capacitor 104. The other electrode of the capacitor 104 may be coupled to a plateline (PL) 160. As described in greater detail below, the WL 140, the BL 150, and the PL 160 are control lines which, together, may be used to read and program (i.e., write) logic states to be stored by the memory cell 100. In the following, the electrode of the capacitor 104 coupled to the access transistor 102 is referred to as a "first capacitor electrode" (labeled in the example of FIG. 1 as C1), while the electrode of the capacitor 104 coupled to the PL 160 is referred to as a "second capacitor electrode" (labeled in the example of FIG. 1 as C2). An intermediate node 106, also shown in FIG. 1, refers to the source or drain terminals of the access transistor 102 that is coupled to the first capacitor electrode of the capacitor 104.

Each of the WL 140, the BL 150, and the PL 160, as well as intermediate elements coupling these lines to various terminals described herein, may be formed of any suitable electrically conductive material, which may include an alloy or a stack of multiple electrically conductive materials. In some embodiments, such electrically conductive materials may include one or more metals or metal alloys, with metals such as ruthenium, palladium, platinum, cobalt, nickel, hafnium, zirconium, titanium, tantalum, and aluminum. In some embodiments, such electrically conductive materials may include one or more electrically conductive alloys oxides or carbides of one or more metals.

As is commonly known, designations of "source" and "drain" may be interchangeable in transistors. Therefore, while the example of FIG. 1 illustrates that the access transistor 102 is coupled to the capacitor 104 by its drain terminal, in other embodiments, any one of a source or a drain terminal of the access transistor 102 may be coupled to the first electrode of the capacitor 104. A source and a drain terminal of a transistor is sometimes referred to in the following as a "transistor terminal pair" and a "first terminal" of a transistor terminal pair is used to describe, for the access transistor 102, the terminal that is connected to the BL, while a "second terminal" is used to describe the source or drain terminal of the access transistor that is connected to the second capacitor electrode of the capacitor 104.

As shown in FIG. 1A, in some embodiments, instead of, or in addition to, a regular dielectric material used in conventional dielectric (i.e., not hysteretic) capacitors, the capacitor 104 may include a hysteretic material or a hysteretic arrangement, which, together, may be referred to as a "hysteretic element 108." In such embodiments, the capacitor 104 may be described as a "hysteretic capacitor." The hysteretic element 108 used as a capacitor insulator of the capacitor 104 may have a thickness that may, in some embodiments, be between about 0.5 nanometers and 10 nanometers, including all values and ranges therein (e.g., between about 1 and 8 nanometers, or between about 0.5 and 5 nanometers).

In some embodiments, the hysteretic element 108 may be provided as a layer of a FE or an AFE material. Such an FE/AFE material may include one or more materials that can exhibit sufficient FE/AFE behavior even at thin dimensions, e.g., such as an insulator material at least about 5%, e.g., at least about 7% or at least about 10%, of which is in an orthorhombic phase and/or a tetragonal phase (e.g., as a material in which at most about 95-90% of the material may be amorphous or in a monoclinic phase). For example, such materials may be based on hafnium and oxygen (e.g., hafnium oxides), with various dopants added to ensure sufficient amount of an orthorhombic phase or a tetragonal phase. Some examples of such materials include materials that include hafnium, oxygen, and zirconium (e.g., hafnium zirconium oxide (HfZrO, also referred to as HZO)), materials that include hafnium, oxygen, and silicon (e.g., silicon-doped (Si-doped) hafnium oxide), materials that include hafnium, oxygen, and germanium (e.g., germanium-doped (Ge-doped) hafnium oxide), materials that include hafnium, oxygen, and aluminum (e.g., aluminum-doped (Al-doped) hafnium oxide), and materials that include hafnium, oxygen, and yttrium (e.g., yttrium-doped (Y-doped) hafnium oxide). However, in other embodiments, any other materials which exhibit FE/AFE behavior at thin dimensions may be used as the hysteretic element 108, and are within the scope of the present disclosure.

In other embodiments, the hysteretic element 108 may be provided as a stack of alternating layers of materials that can trap charges. In some such embodiments, the stack may be a two-layer stack, where one layer is a charge-trapping layer and the other layer is a tunnelling layer. The tunnelling layer may include an insulator material such as a material that includes silicon and oxygen (e.g., silicon oxide), or any other suitable insulator. The charge-trapping layer may include an electrically conductive material such as a metal, or a semiconductor material. In some embodiments, the charge-trapping layer may include a material that includes silicon and nitrogen (e.g., silicon nitride). In general, any material that has defects that can trap charge may be used in/as a charge-trapping layer. Such defects are very detrimental to operation of logic devices and, therefore, typically, deliberate steps need to be taken to avoid presence of the defects. However, for memory devices, such defects are desirable because charge-trapping may be used to represent different memory states of a memory cell.

In some embodiments of the hysteretic element 108 being provided as a stack of alternating layers of materials that can trap charges, the stack may be a three-layer stack where an insulator material is provided on both sides of a charge-trapping layer. In such embodiments, a layer of an insulator material on one side of the charge-trapping layer may be referred to as a "tunnelling layer" while a layer of an insulator material on the other side of the charge-trapping layer may be referred to as a "field layer."

In various embodiments of the hysteretic element 108 being provided as a stack of alternating layers of materials that can trap charges, a thickness of each layer the stack may be between about 0.5 and 10 nanometers, including all values and ranges therein, e.g., between about 0.5 and 5 nanometers. In some embodiment of a three-layer stack, a thickness of each layer of the insulator material may be about 0.5 nanometers, while a thickness of the charge-trapping layer may be between about 1 and 8 nanometers, e.g., between about 2.5 and 7.5 nanometers, e.g., about 5 nanometers. In some embodiments, a total thickness of the hysteretic element 108 provided as a stack of alternating layers of materials that can trap charges (i.e., a hysteretic arrangement) may be between about 1 and 10 nanometers, e.g., between about 2 and 8 nanometers, e.g., about 6 nanometers.

FIG. 1B illustrates that, in some embodiments, the hysteretic element 108 may be used in a gate stack of the access transistor 102, e.g., instead of, or in addition to, a regular gate dielectric material used in conventional (i.e., not hysteretic) transistors. In such embodiments, the access transistor 102 may be described as a "hysteretic access transistor." The hysteretic element 108 used as a gate insulator of the access transistor 102 may have a thickness similar to that of the hysteretic element 108 used as a capacitor insulator of the capacitor 104, described above, and may include any of the hysteretic materials/arrangements described above.

FIG. 1C illustrates that, in some embodiments, the hysteretic element 108 may be used, both, as a capacitor insulator of the capacitor 104, instead of, or in addition to, a regular dielectric material used in conventional dielectric (i.e., not hysteretic) capacitors, and in a gate stack of the access transistor 102, instead of, or in addition to, a regular gate dielectric material used in conventional (i.e., not hysteretic) transistors. Descriptions provided to the use of the hysteretic element 108 in the capacitor 104 and in the access transistor 102, provided above, are applicable to the memory cell 100 of FIG. 1C and, in the interest of brevity, are not repeated.

Figure 2:
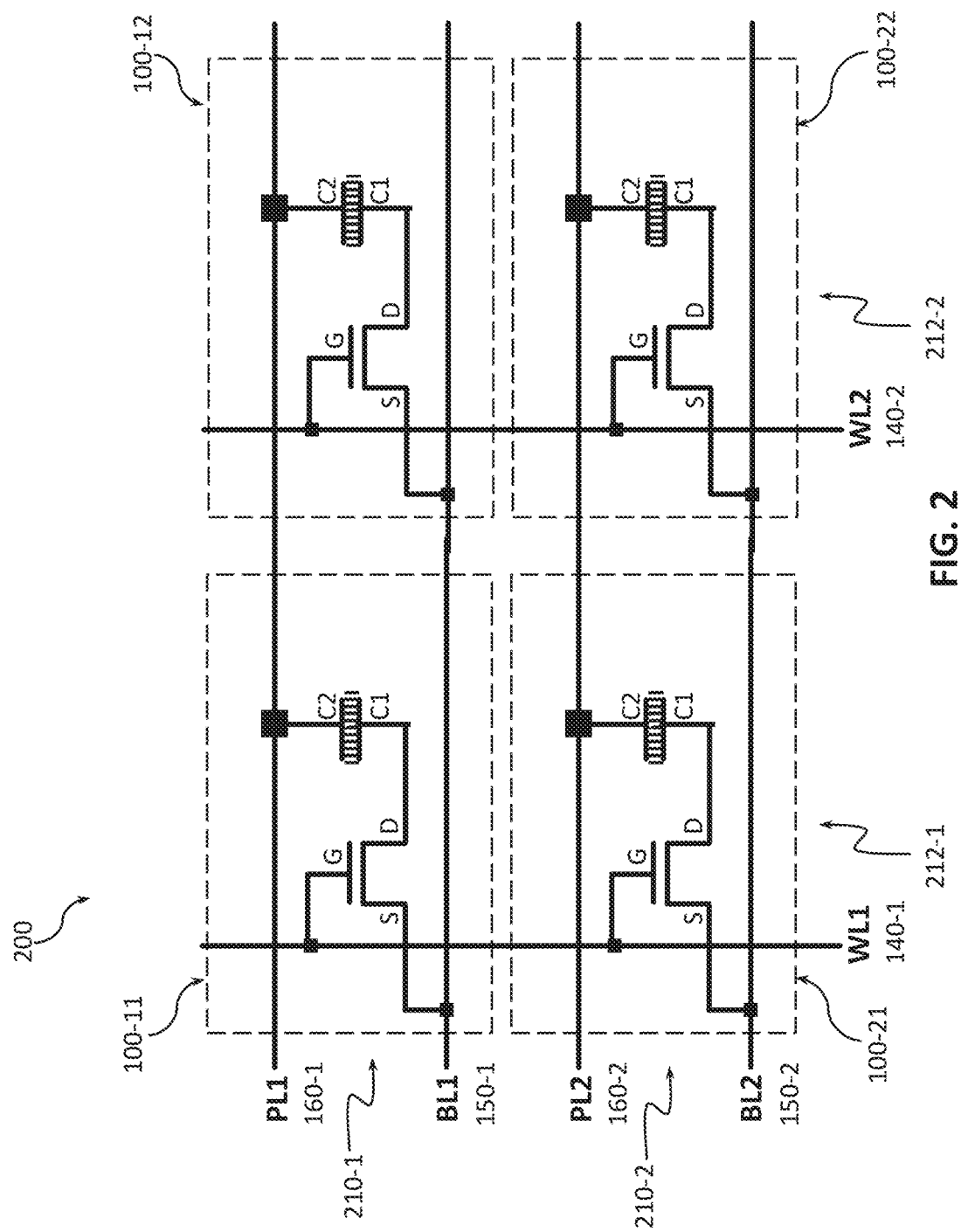
FIG. 2 provides a schematic illustration of a plurality of hysteretic memory cells arranged in a memory array, according to some embodiments of the present disclosure.

FIG. 2 provides a schematic illustration of a plurality of hysteretic memory cells arranged in a memory array 200, according to some embodiments of the present disclosure.

Each memory cell shown in FIG. 2 could be any one of the hysteretic memory cells 100 as described herein. While only four such memory cells are shown in FIG. 2, labeled as memory cells 100-11, 100-12, 100-21, and 100-22, in other embodiments, the array 200 may, and typically would, include many more memory cells. Furthermore, in other embodiments, the hysteretic memory cells 100 as described herein may be arranged in arrays in other manners as known in the art, all of which being within the scope of the present disclosure. Still further, while FIG. 2 illustrates the embodiment in which the memory cells 100 are implemented as shown in FIG. 1A (i.e., the capacitor 104 is a hysteretic capacitor, while the access transistor 102 is a non-hysteretic access transistor), descriptions provided with respect to the memory array 200 are equally applicable if any of the memory cells of the array 200 are implemented as the memory cells 100 as shown in FIG. 1B and/or as shown in FIG. 1C.

FIG. 2 illustrates that, in some embodiments, a single BL 150 and a corresponding single PL 160 can be shared among multiple memory cells 100 in a column 210, and that a single WL 140 can be shared among multiple memory cells 100 in a row 212 of the array 200. As is conventionally used in context of memory, the terms "row" and "column" do not reflect the, respectively, horizontal and vertical orientations on a page of an electrical circuit diagram illustrating a memory array (e.g., as the electrical circuit diagram shown in FIG. 2) but, instead, reflect on how individual memory cells are addressed. Namely, memory cells sharing a single BL are said to be in the same column, while memory cells sharing a single WL are said to be on the same row. Thus, in FIG. 2, the horizontal lines of the memory cells 100 are referred to as columns 210-1 and 210-2, while the vertical lines of the memory cells 110 refer to as rows 212-1 and 212-2. Thus, as shown in FIG. 2, the first column 210-1 includes the memory cells 100-11 and 100-12, each of which is coupled to the first BL (BL1) 150-1 and the first PL (PL1) 160-1, the second column 210-1 includes the memory cells 100-21 and 100-22, each of which is coupled to the second BL (BL2) 150-2 and the second PL (PL2) 160-2, the first row 212-1 includes the memory cells 100-11 and 100-21, each of which is coupled to the first WL (WL1) 140-1, and the second row 212-2 includes the memory cells 100-12 and 100-22, each of which is coupled to the second WL (WL2) 140-2. Each memory cell 100 may then be addressed by using the BL 150 and the PL 160 corresponding to the column 210 to which the memory cell 100 belongs and by using the WL 140 corresponding to the row 212 to which the memory cell 100 belongs. For example, the memory cell 100-11 is controlled by the WL1 140-1, the BL1 150-1, and the PL1 160-1, the memory cell 100-12 is controlled by the WL2 140-2, the BL1 150-1, and the PL1 160-1, the memory cell 100-21 is controlled by the WL1 140-1, the BL2 150-2, and the PL2 160-2, and the memory cell 100-22 is controlled by the WL2 140-2, the BL2 150-2, and the PL2 160-2.

It should be noted that, just as the horizontal and vertical orientations on a page of an electrical circuit diagram illustrating a memory array does imply functional division of memory cells into rows and columns as used in common language, the orientation of various elements on a page of an electrical circuit diagram illustrating a memory array does not imply that the same orientation is used for the actual physical layout of a memory array. For example, in an IC device implementing the memory array 200, corresponding BLs and PLs (i.e., BLs and PLs coupled to each of the individual columns 210) do not have to physically extend in a direction parallel to one another (although they may), or the WLs do not have to physically extend in a direction perpendicular to the BLs (although they may).

In some embodiments, the access transistors 102 may be implemented as transistors having a non-planar architecture. Examples of transistors having a non-planar architecture include double-gate transistors, trigate transistors, FinFETs, and nanoribbon-based transistors. In comparison to a planar architecture where the transistor channel has only one confinement surface, a non-planar architecture is any type of architecture where the transistor channel has more than one confinement surfaces. A confinement surface refers to a particular orientation of the channel surface that is confined by the gate field. Non-planar transistors potentially improve performance relative to transistors having a planar architecture, such as single-gate transistors.

Figure 3:
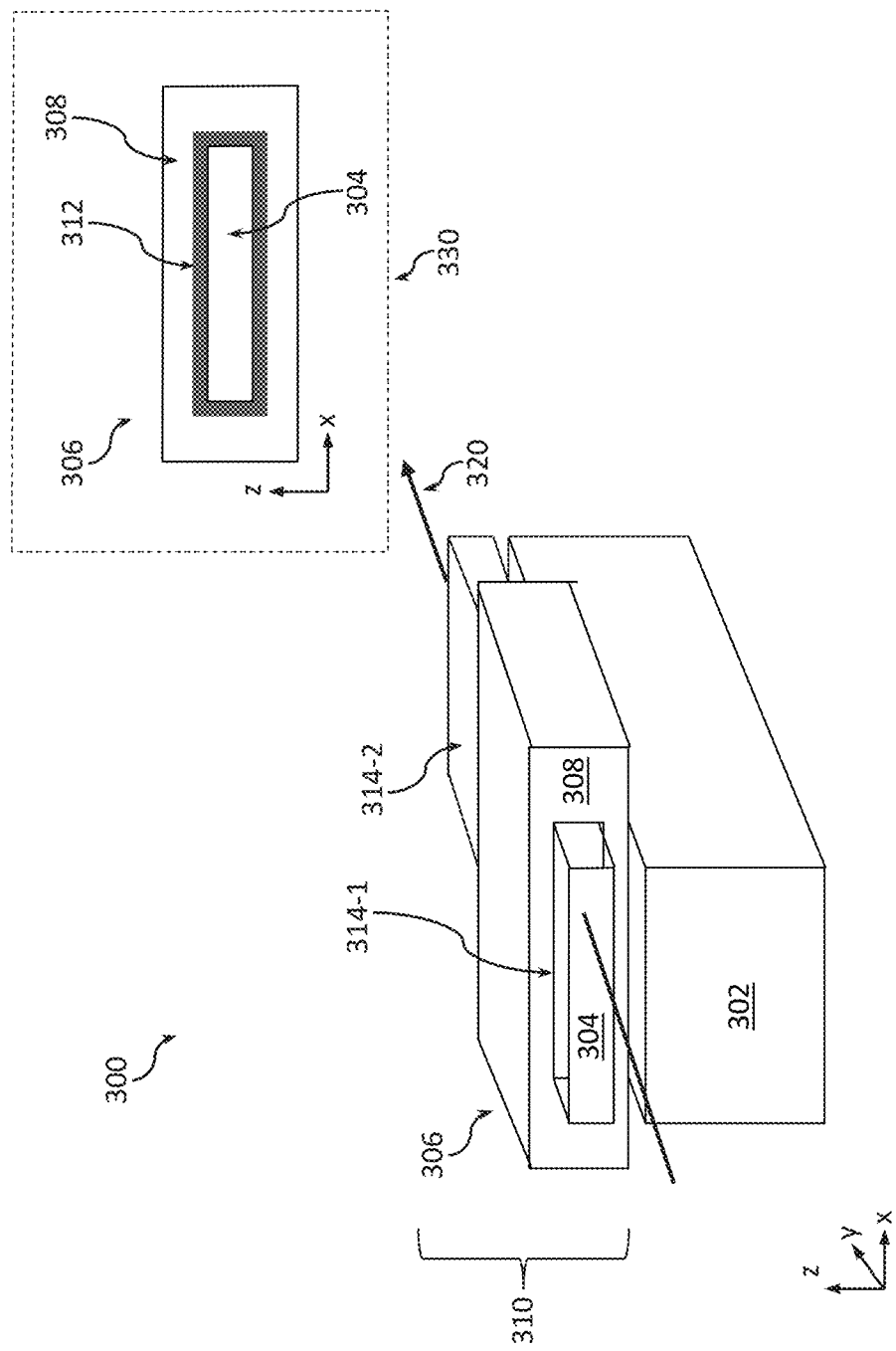
FIG. 3 provides a perspective view of an example nanoribbon-based field-effect transistor (FET), according to some embodiments of the present disclosure.

Nanoribbon-based transistors may be particularly advantageous for continued scaling of CMOS technology nodes due to the potential to form gates on all four sides of a channel material (hence, such transistors are sometimes referred to as "gate all around" transistors). FIG. 3 provides a perspective view of an example IC device 300 with a nanoribbon-based transistor 310 (in particular, a FET), according to some embodiments of the present disclosure. Any of the access transistors 102 described herein may be implemented as the nanoribbon-based transistor 310.

Turning to the details of FIG. 3, the IC device 300 may include a semiconductor material, which may include one or more semiconductor materials, formed as a nanoribbon 304 extending substantially parallel to a support structure 302. The transistor 310 may be formed on the basis of the nanoribbon 304 by having a gate stack 306 at least partially wrap around a portion of the nanoribbon referred to as a "channel portion" and by having source and drain regions, shown in FIG. 3 as a first S/D region 314-1 and a second S/D region 314-2, on either side of the gate stack 306. In some embodiments, a layer of oxide material (not specifically shown in FIG. 3) may be provided between the support structure 302 and the gate stack 306.

The IC device 300 shown in FIG. 3, as well as IC devices shown in other drawings of the present disclosure, is intended to show relative arrangements of some of the components therein, and the IC device 300, or portions thereof, may include other components that are not illustrated (e.g., electrical contacts to the S/D regions 314 of the transistor 310, additional layers such as a spacer layer around the gate electrode of the transistor 310, etc.). For example, although not specifically illustrated in FIG. 3, a dielectric spacer may be provided between a first S/D electrode (which may also be referred to as a "first S/D contact") coupled to a first S/D region 314-1 of the transistor 310 and the gate stack 306 as well as between a second S/D electrode (which may also be referred to as a "second S/D contact") coupled to a second S/D region 314-2 of the transistor 310 and the gate stack 306 in order to provide electrical isolation between the source, gate, and drain electrodes. In another example, although not specifically illustrated in FIG. 3, at least portions of the transistor 310 may be surrounded in an insulator material, such as any suitable interlayer dielectric (ILD) material. In some embodiments, such an insulator material may be a high-k dielectric including elements such as hafnium, silicon, oxygen, titanium, tantalum, lanthanum, aluminum, zirconium, barium, strontium, yttrium, lead, scandium, niobium, and zinc. Examples of high-k materials that may be used for this purpose may include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, tantalum oxide, tantalum silicon oxide, lead scandium tantalum oxide, and lead zinc niobate. In other embodiments, the insulator material surrounding portions of the transistor 310 may be a low-k dielectric material. Some examples of low-k dielectric materials include, but are not limited to, silicon dioxide, carbon-doped oxide, silicon nitride, organic polymers such as perfluorocyclobutane or polytetrafluoroethylene, fused silica glass (FSG), and organosilicates such as silsesquioxane, siloxane, or organosilicate glass.

Implementations of the present disclosure may be formed or carried out on any suitable support structure 302, such as a substrate, a die, a wafer, or a chip. The support structure 302 may, e.g., be the wafer 2000 of FIG. 6, discussed below, and may be, or be included in, a die, e.g., the singulated die 2002 of FIG. 6, discussed below. The support structure 302 may be a semiconductor substrate composed of semiconductor material systems including, for example, N-type or P-type materials systems. In one implementation, the semiconductor substrate may be a crystalline substrate formed using a bulk silicon or a silicon-on-insulator (SOI) substructure. In other implementations, the semiconductor substrate may be formed using alternate materials, which may or may not be combined with silicon, that include, but are not limited to, germanium, silicon germanium, indium antimonide, lead telluride, indium arsenide, indium phosphide, gallium arsenide, aluminum gallium arsenide, aluminum arsenide, indium aluminum arsenide, aluminum indium antimonide, indium gallium arsenide, gallium nitride, indium gallium nitride, aluminum indium nitride or gallium antimonide, or other combinations of group III-V materials (i.e., materials from groups III and V of the periodic system of elements), group II-VI (i.e., materials from groups II and IV of the periodic system of elements), or group IV materials (i.e., materials from group IV of the periodic system of elements). In some embodiments, the substrate may be non-crystalline. In some embodiments, the support structure 302 may be a printed circuit board (PCB) substrate. Although a few examples of materials from which the support structure 302 may be formed are described here, any material that may serve as a foundation upon which an IC device with 3D nanoribbon-based hysteretic memory as described herein may be built falls within the spirit and scope of the present disclosure.

The nanoribbon 304 may take the form of a nanowire or nanoribbon, for example. In some embodiments, an area of a transversal cross-section of the nanoribbon 304 (i.e., an area in the x-z plane of the example coordinate system x-y-z shown in the present drawings) may be between about 25 and 30000 square nanometers, including all values and ranges therein (e.g., between about 25 and 3000 square nanometers, or between about 25 and 500 square nanometers). In some embodiments, a width of the nanoribbon 304 (i.e., a dimension measured in a plane parallel to the support structure 302 and in a direction perpendicular to a longitudinal axis 320 of the nanoribbon 304, e.g., along the y-axis of the example coordinate system shown in FIG. 3) may be at least about 3 times larger than a height of the nanoribbon 304 (i.e., a dimension measured in a plane perpendicular to the support structure 302, e.g., along the z-axis of the example coordinate system shown in FIG. 3), including all values and ranges therein, e.g., at least about 4 times larger, or at least about 5 times larger. Although the nanoribbon 304 illustrated in FIG. 3 is shown as having a rectangular cross-section, the nanoribbon 304 may instead have a cross-section that is rounded at corners or otherwise irregularly shaped, and the gate stack 306 may conform to the shape of the nanoribbon 304. The term "face" of a nanoribbon may refer to the side of the nanoribbon 304 that is larger than the side perpendicular to it (when measured in a plane substantially perpendicular to the longitudinal axis 320 of the nanoribbon 304), the latter side being referred to as a "sidewall" of a nanoribbon.

In various embodiments, the semiconductor material of the nanoribbon 304 may be composed of semiconductor material systems including, for example, N-type or P-type materials systems. In some embodiments, the nanoribbon 304 may include a high mobility oxide semiconductor material, such as tin oxide, antimony oxide, indium oxide, indium tin oxide, titanium oxide, zinc oxide, indium zinc oxide, gallium oxide, titanium oxynitride, ruthenium oxide, or tungsten oxide. In some embodiments, the nanoribbon 304 may include a combination of semiconductor materials. In some embodiments, the nanoribbon 304 may include a monocrystalline semiconductor, such as silicon (Si) or germanium (Ge). In some embodiments, the nanoribbon 304 may include a compound semiconductor with a first sub-lattice of at least one element from group III of the periodic table (e.g., Al, Ga, In), and a second sub-lattice of at least one element of group V of the periodic table (e.g., P, As, Sb).

For some example N-type transistor embodiments (i.e., for the embodiments where the transistor 310 is an N-type metal-oxide-semiconductor (NMOS) transistor), the channel material of the nanoribbon 304 may include a III-V material having a relatively high electron mobility, such as, but not limited to InGaAs, InP, InSb, and InAs. For some such embodiments, the channel material of the nanoribbon 304 may be a ternary III-V alloy, such as InGaAs, GaAsSb, InAsP, or InPSb. For some $In_xGa_{1-x}As$ embodiments, In content (x) may be between 0.6 and 0.9, and may advantageously be at least 0.7 (e.g., $In_{0.7}Ga_{0.3}As$). For some example P-type transistor embodiments (i.e., for the embodiments where the transistor 310 is a P-type metal-oxide-semiconductor (PMOS) transistor), the channel material of the nanoribbon 304 may advantageously be a group IV material having a high hole mobility, such as, but not limited to Ge or a Ge-rich SiGe alloy. For some example embodiments, the channel material of the nanoribbon 304 may have a Ge content between 0.6 and 0.9, and advantageously may be at least 0.7.

In some embodiments, the channel material of the nanoribbon 304 may be a thin-film material, such as a high mobility oxide semiconductor material, such as tin oxide, antimony oxide, indium oxide, indium tin oxide, titanium oxide, zinc oxide, indium zinc oxide, indium gallium zinc oxide (IGZO), gallium oxide, titanium oxynitride, ruthenium oxide, or tungsten oxide. In general, if the transistor formed in the nanoribbon is a thin-film transistor (TFT), the channel material of the nanoribbon 304 may include one or more of tin oxide, cobalt oxide, copper oxide, antimony oxide, ruthenium oxide, tungsten oxide, zinc oxide, gallium oxide, titanium oxide, indium oxide, titanium oxynitride, indium tin oxide, indium zinc oxide, nickel oxide, niobium oxide, copper peroxide, IGZO, indium telluride, molybdenite, molybdenum diselenide, tungsten diselenide, tungsten disulfide, N- or P-type amorphous or polycrystalline silicon, germanium, indium gallium arsenide, silicon germanium, gallium nitride, aluminum gallium nitride, indium phosphite, and black phosphorus, each of which may possibly be doped with one or more of gallium, indium, aluminum, fluorine, boron, phosphorus, arsenic, nitrogen, tantalum, tungsten, and magnesium, etc. In some embodiments, the channel material of the nanoribbon 304 may have a thickness between about 5 and 75 nanometers, including all values and ranges therein. In some embodiments, a thin-film channel material may be deposited at relatively low temperatures, which allows depositing the channel material within the thermal budgets imposed on back end fabrication to avoid damaging other components, e.g., front-end components such as the logic devices.

A gate stack 306 including a gate electrode material 308 and, optionally, a gate dielectric material 312, may wrap entirely or almost entirely around a portion of the nanoribbon 304 as shown in FIG. 3, with the active region (channel region) of the channel material of the transistor 310 corresponding to the portion of the nanoribbon 304 wrapped by the gate stack 306. The gate dielectric material 312 is not shown in the perspective drawing of the IC device 300 shown in FIG. 3 but is shown in an inset 330 of FIG. 3, providing a cross-sectional side view of a portion of the nanoribbon 304 with a gate stack 306 wrapping around it. As shown in FIG. 3, the gate dielectric material 312 may wrap around a transversal portion of the nanoribbon 304 and the gate electrode material 308 may wrap around the gate dielectric material 312.

The gate electrode material 308 may include at least one P-type work function metal or N-type work function metal, depending on whether the transistor 310 is a PMOS transistor or an NMOS transistor (P-type work function metal used as the gate electrode material 308 when the transistor 310 is a PMOS transistor and N-type work function metal used as the gate electrode material 308 when the transistor 310 is an NMOS transistor). For a PMOS transistor, metals that may be used for the gate electrode material 308 may include, but are not limited to, ruthenium, palladium, platinum, cobalt, nickel, and conductive metal oxides (e.g., ruthenium oxide). For an NMOS transistor, metals that may be used for the gate electrode material 308 include, but are not limited to, hafnium, zirconium, titanium, tantalum, aluminum, alloys of these metals, and carbides of these metals (e.g., hafnium carbide, zirconium carbide, titanium carbide, tantalum carbide, and aluminum carbide). In some embodiments, the gate electrode material 308 may include a stack of two or more metal layers, where one or more metal layers are work function metal layers and at least one metal layer is a fill metal layer. Further layers may be included next to the gate electrode material 308 for other purposes, such as to act as a diffusion barrier layer or/and an adhesion layer.

In some embodiments, the gate dielectric material 312 may include one or more high-k dielectrics including any of the materials discussed herein with reference to the insulator material that may surround portions of the transistor 310. In some embodiments, an annealing process may be carried out on the gate dielectric material 312 during manufacture of the transistor 310 to improve the quality of the gate dielectric material 312. The gate dielectric material 312 may have a thickness that may, in some embodiments, be between about 0.5 nanometers and 3 nanometers, including all values and ranges therein (e.g., between about 1 and 3 nanometers, or between about 1 and 2 nanometers). In some embodiments, the gate stack 306 may be surrounded by a gate spacer, not shown in FIG. 3. Such a gate spacer would be configured to provide separation between the gate stack 306 and source/drain contacts of the transistor 310 and could be made of a low-k dielectric material, some examples of which have been provided above. A gate spacer may include pores or air gaps to further reduce its dielectric constant.

In some embodiments, e.g., when the transistor 310 is the access transistor 102 that is a hysteretic access transistor as described with reference to FIG. 1B and FIG. 1C, the gate dielectric material 312 may be replaced with, or complemented by, the hysteretic element 108, described above. Unless specified otherwise, descriptions provided herein with respect to the gate dielectric material 312 are equally application to embodiments where the gate dielectric material 312 is replaced with, or complemented by, the hysteretic element 108.

Turning to the S/D regions 314 of the transistor 310, in some embodiments, the S/D regions may be highly doped, e.g., with dopant concentrations of about $10^{21}$ cm$^{-3}$, in order to advantageously form Ohmic contacts with the respective S/D electrodes, although these regions may also have lower dopant concentrations and may form Schottky contacts in some implementations. Irrespective of the exact doping levels, the S/D regions of a transistor are the regions having dopant concentration higher than in other regions, e.g., higher than a dopant concentration in the transistor channel (i.e., in a channel material extending between the first S/D region 314-1 and the second S/D region 314-2), and, therefore, may be referred to as "highly doped" (HD) regions. The channel portion of the transistor 310 may include semiconductor materials with doping concentrations significantly smaller than those of the S/D regions 314.

The S/D regions 314 of the transistor 310 may generally be formed using either an implantation/diffusion process or an etching/deposition process. In the former process, dopants such as boron, aluminum, antimony, phosphorous, or arsenic may be ion-implanted into the nanoribbon 304 to form the source and drain regions. An annealing process that activates the dopants and causes them to diffuse further into the nanoribbon 304 may follow the ion implantation process. In the latter process, portions of the nanoribbon 304 may first be etched to form recesses at the locations of the future S/D regions 314. An epitaxial deposition process may then be carried out to fill the recesses with material that is used to fabricate the S/D regions 314. In some implementations, the S/D regions 314 may be fabricated using a silicon alloy such as silicon germanium or silicon carbide. In some implementations, the epitaxially deposited silicon alloy may be doped in situ with dopants such as boron, arsenic, or phosphorous. In further embodiments, the S/D regions 314 may be formed using one or more alternate semiconductor materials such as germanium or a group III-V material or alloy. And in further embodiments, one or more layers of metal and/or metal alloys may be used to form the S/D regions 314. In some embodiments, a distance between the first and second S/D regions 314 (i.e., a dimension measured along the longitudinal axis 320 of the nanoribbon 304) may be between about 5 and 40 nanometers, including all values and ranges therein (e.g., between about 22 and 35 nanometers, or between about 20 and 30 nanometers).

The nanoribbon 304 may form a basis for forming nanoribbon-based transistor arrangements implementing gate all around. Below, example arrangements in which a plurality of nanoribbon-based hysteretic memory cells 100 may be arranged to form a memory array are described with reference to FIGS. 4A-4H, illustrating example layouts of an IC device 401, according to some embodiments of the present disclosure.

Figure 4B:
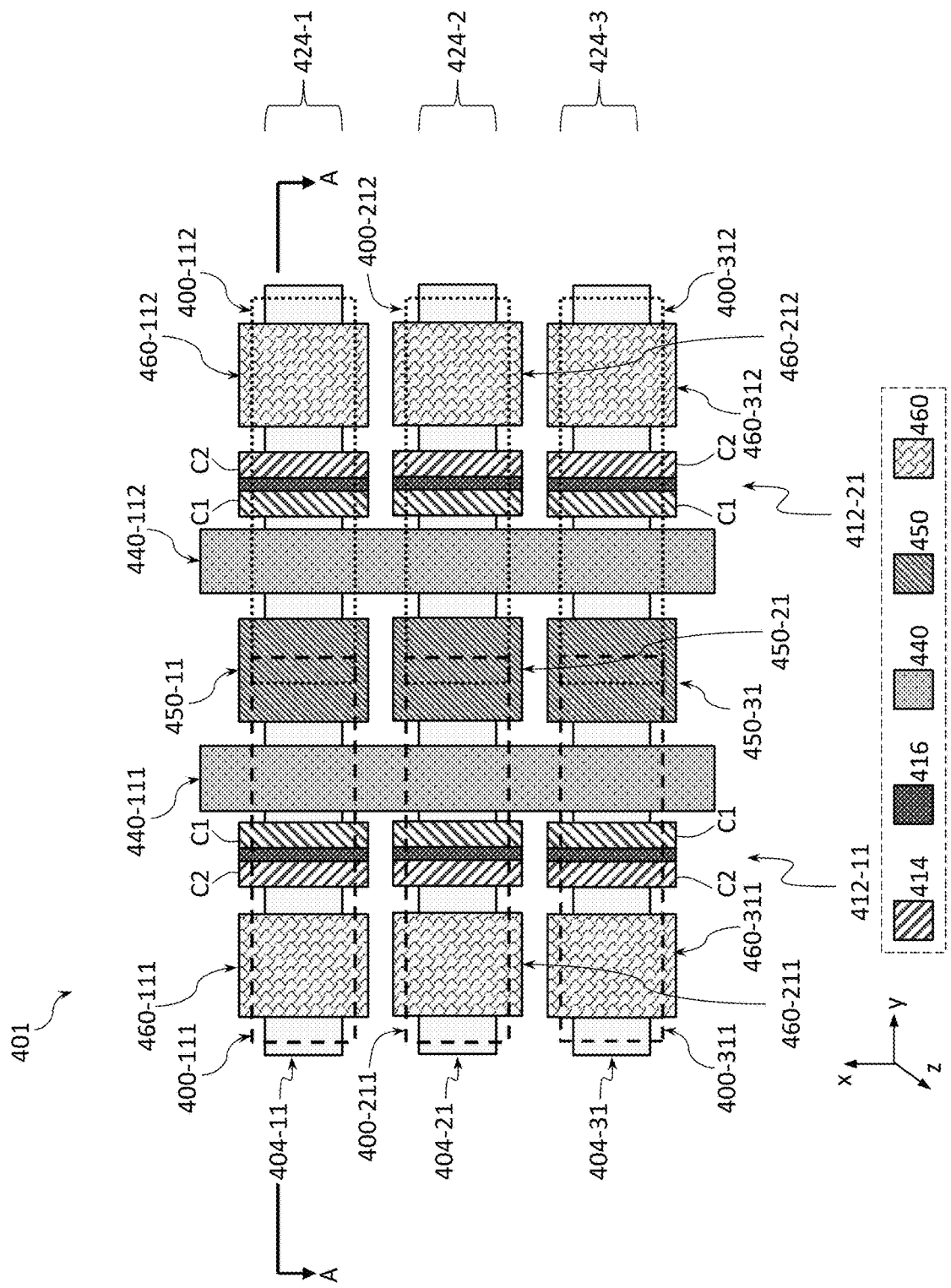
Figure 4C:
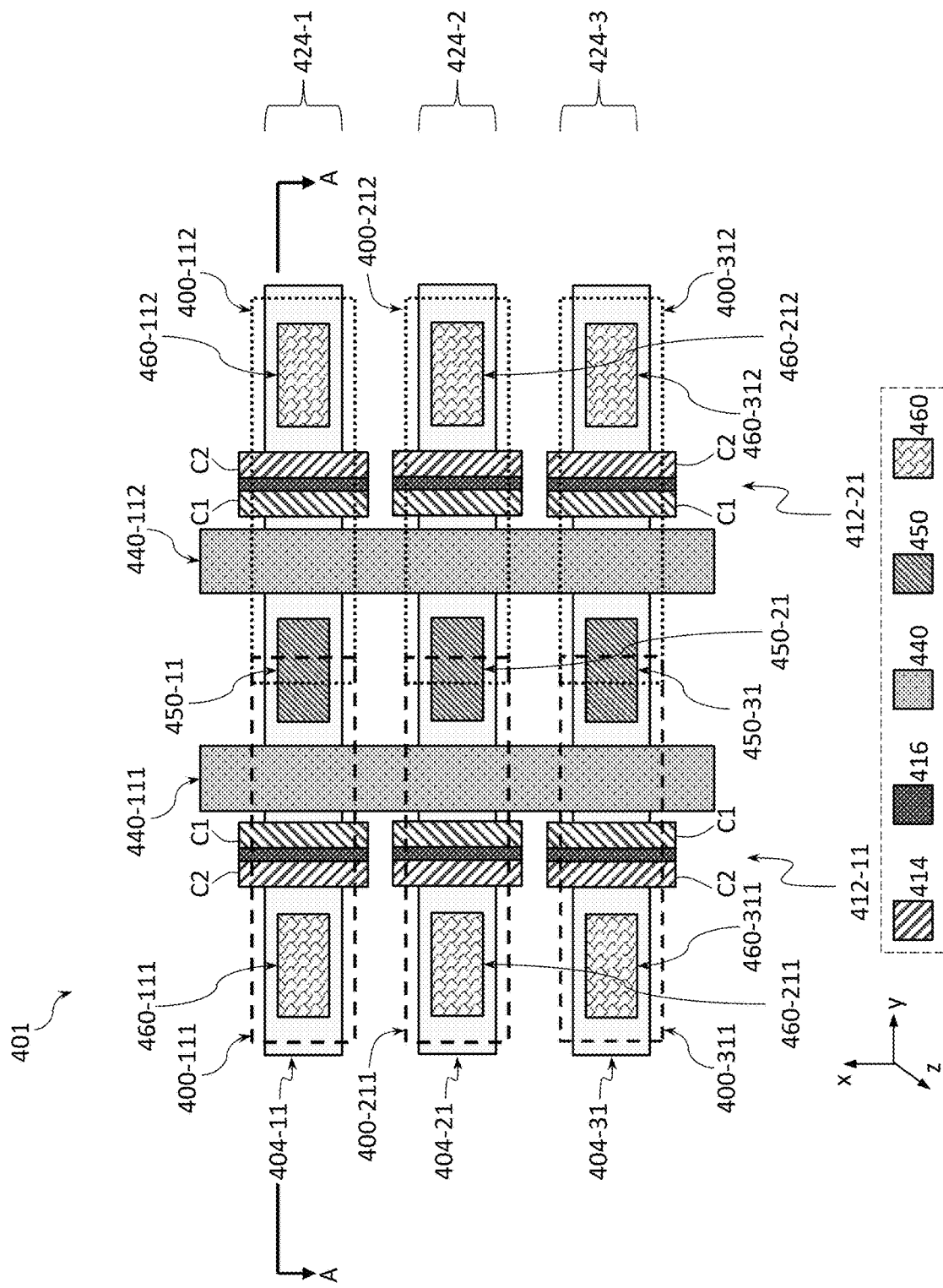
Figure 4D:
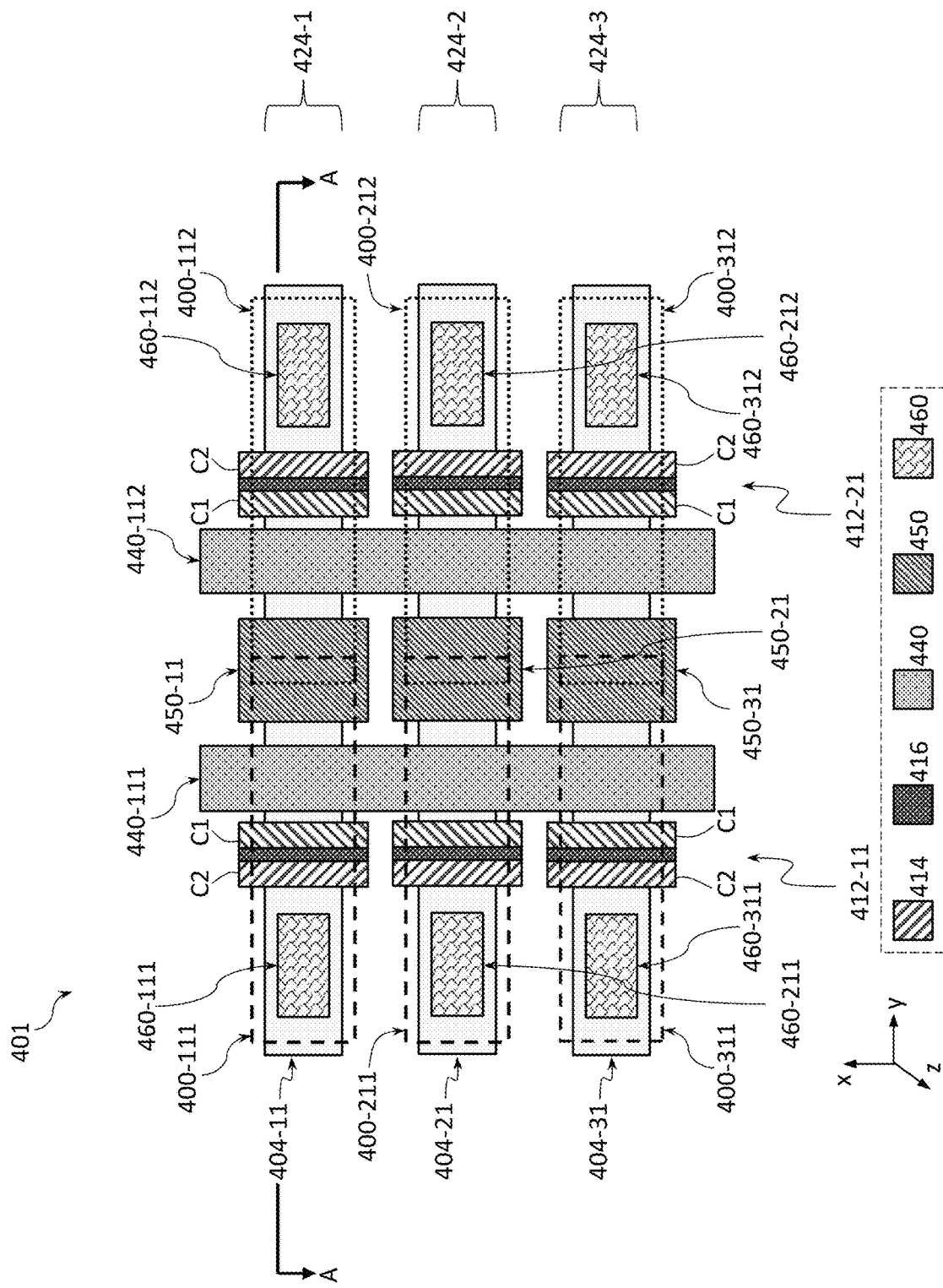
Figure 4F:
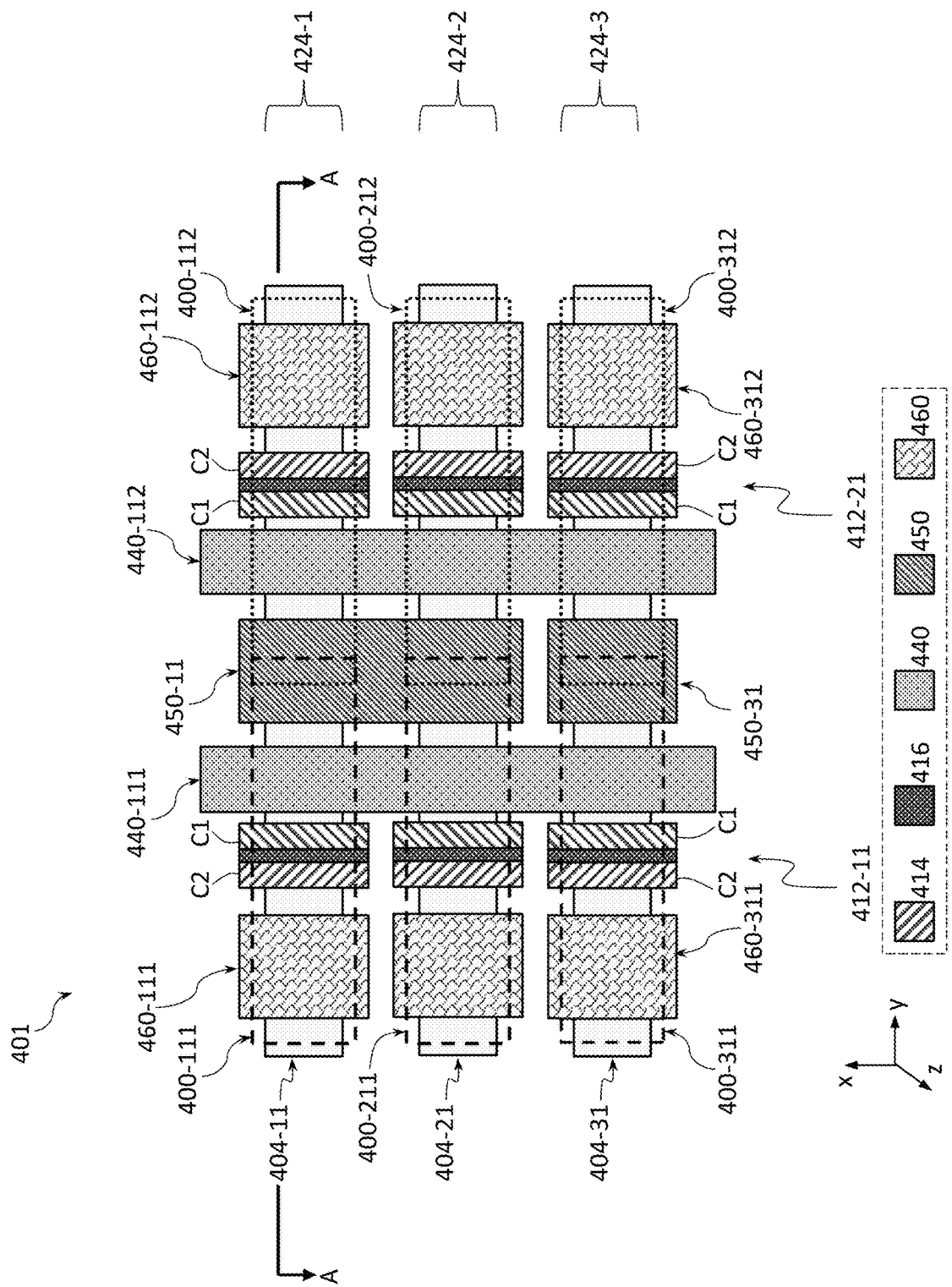
Figure 4G:
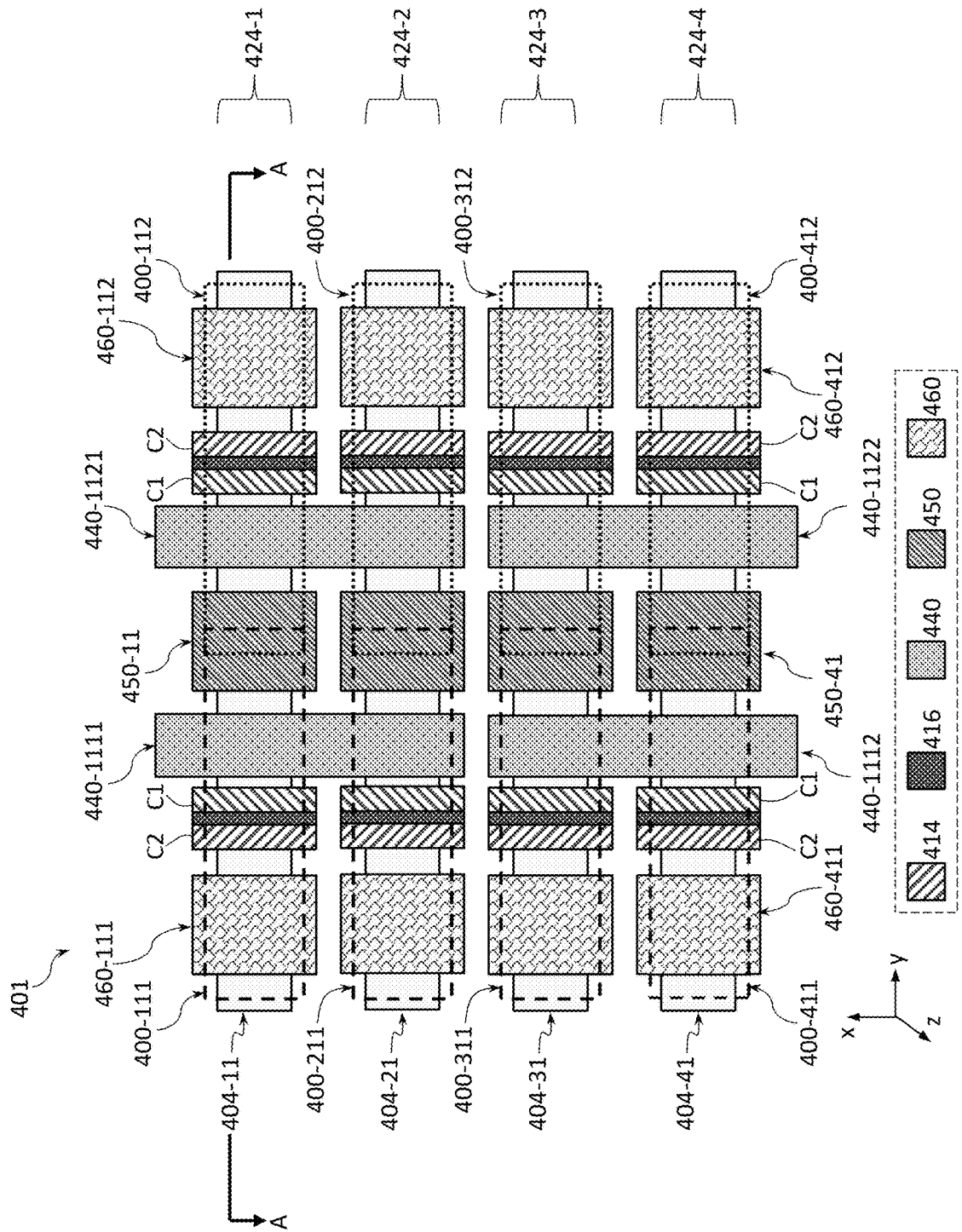

A number of elements referred to in the description of FIGS. 4A-4H with reference numerals are illustrated in these figures with different patterns, with a legend showing the correspondence between the reference numerals and patterns being provided at the bottom of each drawing page containing FIGS. 4A-4H. For example, the legend illustrates that FIGS. 4A-4H use different patterns to show capacitor electrode materials 414, a capacitor insulator 416, a WL 440, a BL 450, and a PL 460. Furthermore, although a certain number of a given element may be illustrated in some of FIGS. 4A-4H (e.g., three stacks 424 of nanoribbons 404 as shown in FIG. 4B or four stacks 424 of nanoribbons 404 as shown in FIG. 4G, with four nanoribbons 404 in each stack), this is simply for ease of illustration, and more, or less, than that number may be included in other IC devices with 3D nanoribbon-based hysteretic memory according to various embodiments of the present disclosure. In general, the IC device 401 may include N stacks 424 of nanoribbons 404 provided over a support structure, where an individual nanoribbon stack 424 of the N stacks 424 may include M nanoribbons 404 stacked above one another, where each of N and M is an integer greater than 1. Still further, various views shown in FIGS. 4A-4H are intended to show relative arrangements of some of the components therein, and the IC device 401, or portions thereof, may include other components that are not illustrated. For example, although not specifically illustrated in FIG. 4, portions of the IC device 401 that are shown in FIG. 4 may be provided over a support structure (e.g., the support structure 302) and may be surrounded in an insulator material, e.g., any of the ILD materials described above.

Two different views are shown in FIGS. 4A-4H an attempt to bring clarity of the arrangement of the various embodiments of the IC device 401. For example, some of FIGS. 4A-4H illustrate cross-sectional side views in a cross-section taken along a plane perpendicular to a support structure over which the IC device 401 may be provided and containing a longitudinal axis of nanoribbons 404 (i.e., views of a y-z plane of the example coordinate system shown in the present drawings, showing details of the first nanoribbon stack 424-1), while other ones of FIGS. 4A-4H illustrate top-down views from a plane parallel to a support structure over which the IC device 401 may be provided (i.e., views of an x-y plane of the example coordinate system shown in the present drawings, showing details of the top nanoribbons 404 of the first nanoribbon stack 424-1, the second nanoribbon stack 424-2, and the third nanoribbon stack 424-3). The views of the x-y plane shown in FIGS. 4A-4H may be views of a plane BB shown in the views of the y-z plane shown in FIGS. A-4H, while the views of the y-z plane shown in FIGS. 4A-4H may be views of a plane AA shown in the views of the x-y plane shown in FIGS. A-4H.

In FIGS. 4A-4H, different elements may be labeled in different views and not all elements shown in FIGS. 4A-4H are labeled with reference numerals in order to not clutter the drawings. For example, although 8 memory cells 400 are shown in the view of FIG. 4A, only the top two memory cells 400 (i.e., the memory cells provided along the nanoribbon 404-11) are labeled as memory cells 400-111 and 400-112 and the bottom two memory cells 400 (i.e., the memory cells provided along the nanoribbon 404-14) are labeled as memory cells 400-141 and 400-142. In the cross-sectional side view of the plane y-z such as that shown in FIG. 4B, in between the memory cells 400-111 and 400-141 are memory cells 400-121 and 400-131 (not specifically labeled), while in between the memory cells 400-112 and 400-142 are memory cells 400-122 and 400-132 (not specifically labeled).

Each of the memory cells 400 is an example of the memory cells 100, each of the nanoribbons 404 is an example of the nanoribbon 304, and each of the transistors of the memory cells 400 is an example of the nanoribbon-based transistor 310, as described above. Together, collection of the memory cells 400 of the IC device 401 is an example of the memory array 200, where a set 410-11 of the memory cells 400-111 through 400-141 may be an example of the memory cells 100 of the column 210-1 as shown in FIG. 2, while a set 410-21 of the memory cells 400-112 through 400-142 may be an example of the memory cells 100 of a column that is not shown in FIG. 2, and where a set 412-11 of the memory cells 400-111 through 400-311 may be an example of the memory cells 100 of the row 212-1 as shown in FIG. 2, while a set 412-21 of the memory cells 400-112 through 400-312 may be an example of the memory cells 100 of a row that is not shown in FIG. 2. In the IC device 401, for example for the first stack 424-1, each of the vertically stacked nanoribbons 404-11 through 404-14 may be considered to belong to a different one of memory layers stacked above the support structure (with the nanoribbon 404-14 being the one at the bottom, i.e., closest to the support structure, for the example shown). The IC device 401 illustrates an example where two hysteretic memory cells as described herein are provided along each of the nanoribbons 404, where four nanoribbons 404 are shown in each stack 424 of nanoribbons (e.g., see FIG. 4A) and three or four such stacks 424 are shown (e.g., see FIG. 4B showing three stacks 424 and see FIG. 4G showing four stacks 424). In further embodiments, other number of memory cells 400 may be implemented in each of the nanoribbons 404, other number of the nanoribbons 404 may be included in each stack 424 and other number of stacks 424 may be included.

FIG. 4A illustrates an example embodiment of a cross-sectional side view across the nanoribbon stack 424-1 of the IC device 401. As shown in FIG. 4A, in some embodiments, each pair of memory cells 400 along a given nanoribbon 404 may be implemented so that one of their S/D regions/electrodes is shared (e.g., coupled to one another) and is coupled to a shared BL 450.

As shown in FIG. 4A, for the nanoribbon 404-11, a first memory cell 400-111 includes a first access transistor having a gate stack formed by a WL 440-111 at least partially wrapping around a portion of the nanoribbon 404-11 (the gate stack formed by the WL 440-111 being one example of the gate stack 306, described above), where a first S/D region of the first access transistor (for the example shown in FIG. 4A, this is the S/D region that is on the right side of the WL 440-111) is coupled to a BL 450-11 by, e.g., being in contact with the BL 450-11 (where the BL 450-11 may wrap around, and be in contact with, a portion of the nanoribbon 404-11), and a second S/D region of the first access transistor (for the example shown in FIG. 4A, this is the S/D region that is on the left side of WL 440-111) is coupled to a first capacitor electrode, C1, of the capacitor of the memory cell 400-111. Such a first access transistor forms the access transistor 102 of the memory cell 400-111, as described above with reference to the memory cells 100. The second capacitor electrode, C2, of the capacitor of the memory cell 400-111 may be coupled to a PL 460-111, which, similar to the BL 450-11, may also wrap around, and be in contact with, a portion of the nanoribbon 404-11. Each of the first and second capacitor electrodes are shown in FIG. 4 with their capacitor electrode material(s) 414, separated from one another by a capacitor insulator 416, thus forming capacitors 104 of various memory cells 400, as described above with reference to the memory cells 100, where each of the capacitor electrode materials 414 and the capacitor insulators 416 may at least partially wrap around different portions of nanoribbons 404 to form the capacitors 104 of various memory cells 400. As further shown in FIG. 4A, a second memory cell 400-112 may also be provided along the nanoribbon 404-11, and may include a second access transistor having a gate stack formed by a WL 440-112 at least partially wrapping around another portion of the nanoribbon 404-11 (the gate stack formed by the WL 440-112 being another example of the gate stack 306, described above), where a first S/D region of the second access transistor (for the example shown in FIG. 4A, this is the S/D region that is on the left side of the WL 440-112) is coupled to the BL 450-11, and a second S/D region of the second access transistor (for the example shown in FIG. 4A, this is the S/D region that is on the right side of WL 440-112) is coupled to a first capacitor electrode, C1, of the capacitor of the memory cell 400-112. Such a second access transistor forms the access transistor 102 of the memory cell 400-112, as described above with reference to the memory cells 100. The second capacitor electrode, C2, of the capacitor of the memory cell 400-112 may be coupled to a PL 460-112, which, similar to the BL 450-11, may also wrap around, and be in contact with, a portion of the nanoribbon 404-11.

As the foregoing illustrates, the BL 450-11 may be shared between the memory cell 400-111 and the memory cell 400-112 provided along the nanoribbon 404-11 by being coupled to the first S/D regions of the access transistors of these memory cells (the first S/D regions of the access transistors of these memory cells may also be considered shared), while the WL and the PL coupled to these memory cells may be different instances of the WLs 140 and different instances of the PLs 160, the same as the capacitors of these memory cells being different instances of the capacitor 104. As is shown in FIG. 4A, the same may hold for other pairs of memory cells 400 provided along other nanoribbons 404 that are stacked below the nanoribbon 404-11. For example, for the nanoribbon 404-14, a first memory cell 400-141 includes a first access transistor having a gate stack formed by a WL 440-141 at least partially wrapping around a portion of the nanoribbon 404-14 (the gate stack formed by the WL 440-141 being one example of the gate stack 306, described above), where a first S/D region of the first access transistor (for the example shown in FIG. 4A, this is the S/D region that is on the right side of the WL 440-141) is coupled to the BL 450-11 that may wrap around a portion of the nanoribbon 404-14, and a second S/D region of the first access transistor (for the example shown in FIG. 4A, this is the S/D region that is on the left side of WL 440-141) is coupled to a first capacitor electrode, C1, of the capacitor of the memory cell 400-141. Such a first access transistor forms the access transistor 102 of the memory cell 400-141, as described above with reference to the memory cells 100. The second capacitor electrode, C2, of the capacitor of the memory cell 400-141 may be coupled to the PL 460-111, which, similar to the BL 450-11, may also wrap around a portion of the nanoribbon 404-14. On the other hand, a second memory cell 400-142 that is also provided along the nanoribbon 404-14, includes a second access transistor having a gate stack formed by a WL 440-142 at least partially wrapping around another portion of the nanoribbon 404-14 (the gate stack formed by the WL 440-142 being another example of the gate stack 306, described above), where a first S/D region of the second access transistor (for the example shown in FIG. 4A, this is the S/D region that is on the left side of the WL 440-142) is coupled to the BL 450-11, and a second S/D region of the second access transistor (for the example shown in FIG. 4A, this is the S/D region that is on the right side of WL 440-142) is coupled to a first capacitor electrode, C1, of the capacitor of the memory cell 400-142. Such a second access transistor forms the access transistor 102 of the memory cell 400-142, as described above with reference to the memory cells 100. The second capacitor electrode, C2, of the capacitor of the memory cell 400-142 may be coupled to the PL 460-112, which, similar to the BL 450-11, may also wrap around a portion of the nanoribbon 404-14.

As is shown in FIG. 4A, each of the BL 450-11, the PL 460-111 and the PL 460-112 may be shared among different corresponding memory cells 400 provided along the nanoribbons 404-11 through 404-14 of the first stack 424-1 of nanoribbons 404. As further shown in FIG. 4A, the WLs 440 may be different for different ones of the access transistors of the memory cells 400 provided along the nanoribbons 404-11 through 404-14 in a single stack 424 (e.g., in the first nanoribbon stack 424-1).

FIG. 4B illustrates an example embodiment of a top-down view of the memory cells 400 provided along nanoribbons 404 of different nanoribbon stacks 424 of the IC device 401. For example, the memory cells 400-111 and 400-112 as described with reference to FIG. 4A are shown in FIG. 4B for the first nanoribbon stack 424-1, memory cells 400-211 and 400-212 which are similar to the memory cells 400-111 and 400-112 are shown in FIG. 4B for the second nanoribbon stack 424-2, and memory cells 400-311 and 400-312 which are also similar to the memory cells 400-111 and 400-112 are shown in FIG. 4B for the third nanoribbon stack 424-3. Thus, FIG. 4B illustrates the memory cells 400 of the top level of different nanoribbon stacks 424 of the IC device 401.

As is shown in FIG. 4B, each of the WL 440-111 and the WL 440-112 may be shared among different corresponding memory cells 400 provided along the nanoribbons 404-11 through 404-31 of the nanoribbon stacks 424. For example, FIG. 4B illustrates that a single WL 440-111 may extend, and form respective gate stacks coupled to one another, across access transistors of the memory cells 400-111, 400-211, and 400-311, while a single WL 440-112 may extend, and form respective gate stacks coupled to one another, across access transistors of the memory cells 400-112, 400-212, and 400-312. On the other hand, the BL 450 and the PL 460 may be different for different nanoribbon stacks 424. For example, in line with the explanations provided for FIG. 4A, FIG. 4B illustrates that, for the first nanoribbon stack 424-1, the memory cell 400-111 may be coupled to the BL 450-11 and the PL 460-111 and the memory cell 400-112 may be coupled to the BL 450-11 and the PL 460-112, where the BL 450-11 may be shared among the memory cells 400-111 and 400-112, while the PLs 460-111 and 460-112 are not shared among these memory cells. FIG. 4B further illustrates that, for the second nanoribbon stack 424-2, the memory cell 400-211 may be coupled to a BL 450-21 and a PL 460-211 and the memory cell 400-212 may be coupled to the BL 450-21 and a PL 460-212, where the BL 450-21 may be shared among the memory cells 400-211 and 400-212, while the PLs 460-211 and 460-212 are not shared among these memory cells. Similarly, FIG. 4B further illustrates that, for the third nanoribbon stack 424-3, the memory cell 400-311 may be coupled to a BL 450-31 and a PL 460-311 and the memory cell 400-312 may be coupled to the BL 450-31 and a PL 460-312, where the BL 450-31 may be shared among the memory cells 400-311 and 400-312, while the PLs 460-311 and 460-312 are not shared among these memory cells. Although not specifically shown in the present drawings, each of the BL 450-21 and the PLs 460-211 and 460-212 may be shared among the nanoribbons 404-21 through 404-24 of the second nanoribbon stack 424-2 by wrapping around different portions of the nanoribbons 404-21 through 404-24, while each of the BL 450-31 and the PLs 460-311 and 460-312 may be shared among the nanoribbons 404-31 through 404-34 of the third nanoribbon stack 424-3 by wrapping around different portions of the nanoribbons 404-31 through 404-34, in the manner similar as was described for the first nanoribbon stack 424-1. Each one of the memory cells 400 in any of the embodiments shown in FIGS. 4A-4H may have a respective capacitor 104 formed with the capacitor electrode material 414 and the capacitor insulator 416 as shown in FIGS. 4A-4H.

FIG. 4B illustrates an embodiment of the IC device 401 where each of the PLs 460 and the BLs 450 may be electrically continuous among different nanoribbons 404 of a given nanoribbon stack 424 by wrapping around respective portions of the nanoribbons 404. FIG. 4C illustrates an alternative embodiment where, instead of wrapping around the nanoribbons 404, different BLs 450 and different PLs 460 may be electrically continuous among different nanoribbons 404 of a given nanoribbon stack 424 by extending through respective portions of the nanoribbons 404. For example, as shown in FIG. 4C, each of the BL 450-11 and the PLs 460-111 and 460-112 may be shared among the nanoribbons 404-11 to 404-14 of the first nanoribbon stack 424-1 by extending through different portions of the nanoribbons 404-11 to 404-14, each of the BL 450-21 and the PLs 460-211 and 460-212 may be shared among the nanoribbons 404-21 to 404-24 of the second nanoribbon stack 424-2 by extending through different portions of the nanoribbons 404-21 to 404-24, and each of the BL 450-31 and the PLs 460-311 and 460-312 may be shared among the nanoribbons 404-31 to 404-34 of the third nanoribbon stack 424-3 by extending through different portions of the nanoribbons 404-31 to 404-34. In the embodiments where a given BL 450 or a given PL 460 extends through a given nanoribbon 404, a footprint of said BL 450 or said PL 460 may fit within said nanoribbon 404. For example, as shown in FIG. 4C, for the embodiments where any of the PL 460-111, 460-112 and the BL 450-11 extend through the first nanoribbon stack 424-1, widths of the PL 460-111, 460-112 and the BL 450-11 may be smaller than widths of the nanoribbons 404-11, 404-12, and so on, of the first nanoribbon stack 424-1 (said widths measured along the x-axis of the example coordinate system shown in the present drawings). Other explanations provided with reference to FIGS. 4A and 4B are applicable for FIG. 4C and, therefore, in the interests of brevity, are not repeated.

FIG. 4D illustrates an embodiment of the IC device 401 that is one combination of the embodiments of FIG. 4B and FIG. 4C. In particular, FIG. 4D illustrates an embodiment where each of the BLs 450 may be electrically continuous among different nanoribbons 404 of a given nanoribbon stack 424 by wrapping around respective portions of the nanoribbons 404 (i.e., as shown in FIG. 4B), while different PLs 460 may be electrically continuous among different nanoribbons 404 of a given nanoribbon stack 424 by extending through respective portions of the nanoribbons 404 (i.e., as shown in FIG. 4C). For example, as shown in FIG. 4D, each of the PLs 460-111 and 460-112 may be shared among the nanoribbons 404-11 to 404-14 of the first nanoribbon stack 424-1 by extending through different portions of the nanoribbons 404-11 to 404-14, each of the PLs 460-211 and 460-212 may be shared among the nanoribbons 404-21 to 404-24 of the second nanoribbon stack 424-2 by extending through different portions of the nanoribbons 404-21 to 404-24, and each of the PLs 460-311 and 460-312 may be shared among the nanoribbons 404-31 to 404-34 of the third nanoribbon stack 424-3 by extending through different portions of the nanoribbons 404-31 to 404-34. As further shown in FIG. 4D, the BL 450-11 may be shared among the nanoribbons 404-11 to 404-14 of the first nanoribbon stack 424-1 by wrapping around portions of the nanoribbons 404-11 to 404-14, the BL 450-21 may be shared among the nanoribbons 404-21 to 404-24 of the second nanoribbon stack 424-2 by wrapping around portions of the nanoribbons 404-21 to 404-24, and the BL 450-31 may be shared among the nanoribbons 404-31 to 404-34 of the third nanoribbon stack 424-3 by wrapping around portions of the nanoribbons 404-31 to 404-34. Other explanations provided with reference to FIGS. 4A, 4B, and 4C are applicable for FIG. 4D and, therefore, in the interests of brevity, are not repeated.

FIG. 4E illustrates an embodiment of the IC device 401 that is another combination of the embodiments of FIG. 4B and FIG. 4C. In particular, FIG. 4E illustrates an embodiment where each of the BLs 450 may be electrically continuous among different nanoribbons 404 of a given nanoribbon stack 424 by extending through respective portions of the nanoribbons 404 (i.e., as shown in FIG. 4C), while different PLs 460 may be electrically continuous among different nanoribbons 404 of a given nanoribbon stack 424 by wrapping around respective portions of the nanoribbons 404 (i.e., as shown in FIG. 4B). For example, as shown in FIG. 4E, each of the PLs 460-111 and 460-112 may be shared among the nanoribbons 404-11 to 404-14 of the first nanoribbon stack 424-1 by wrapping around different portions of the nanoribbons 404-11 to 404-14, each of the PLs 460-211 and 460-212 may be shared among the nanoribbons 404-21 to 404-24 of the second nanoribbon stack 424-2 by wrapping around different portions of the nanoribbons 404-21 to 404-24, and each of the PLs 460-311 and 460-312 may be shared among the nanoribbons 404-31 to 404-34 of the third nanoribbon stack 424-3 by wrapping around different portions of the nanoribbons 404-31 to 404-34.

As further shown in FIG. 4E, the BL 450-11 may be shared among the nanoribbons 404-11 to 404-14 of the first nanoribbon stack 424-1 by extending through portions of the nanoribbons 404-11 to 404-14, the BL 450-21 may be shared among the nanoribbons 404-21 to 404-24 of the second nanoribbon stack 424-2 by extending through portions of the nanoribbons 404-21 to 404-24, and the BL 450-31 may be shared among the nanoribbons 404-31 to 404-34 of the third nanoribbon stack 424-3 by extending through portions of the nanoribbons 404-31 to 404-34. Other explanations provided with reference to FIGS. 4A, 4B, and 4C are applicable for FIG. 4E and, therefore, in the interests of brevity, are not repeated.

Although not specifically shown in the present drawings, in further embodiments, any of the BLs 450 and the PLs 460 may be implemented as any one of those shown in FIGS. 4B-4E. In other words, combinations of the wrap-around and extend-through versions of any of the BLs 450 and the PLs 460 other than those shown in FIGS. 4C-4E are possible and within the scope of the present disclosure.

FIGS. 4B-4E illustrate embodiments of the IC device 401 where a respective one of the BLs 450 is provided for each of the nanoribbon stacks 424. In other embodiments, a single BL 450 may be electrically continuous among two or more adjacent (nearest neighbors) nanoribbon stacks 424.

For example, as shown in FIG. 4F, in some embodiments, a single BL 450-11 may be electrically continuous among the nanoribbons 404 of the first nanoribbon stack 424-1 and the second nanoribbon stack 424-2 by wrapping around the nanoribbons 404 of these nanoribbon stacks 424.

Sharing a single BL 450 in this manner may be advantageous in terms of increasing memory density in the IC device 401. In such embodiments, the PLs 460 of these nanoribbon stacks 424 may still be separate, as is shown in FIG. 4F with the PLs 460-111 and 460-112 being coupled to the memory cells 400 provided in the first nanoribbon stack 424-1 and with the PLs 460-211 and 460-212 being coupled to the memory cells 400 provided in the second nanoribbon stack 424-2. In this manner, each of the memory cells 400 of the embodiment as shown in FIG. 4F still corresponds to a different, unique combination of a BL 450 and a PL 460, so that a logic state may be read or programmed in each of the memory cells 400 based on the difference in potential between the BL 450 and the PL 460 coupled to this memory cell 400, when the WL 440 coupled to this memory cell 400 selects the memory cell for READ or WRITE operations (the same holds for all other memory cells 400 described herein, e.g., for any of FIGS. 4A-4H).

Although not specifically shown in the present drawings, in further embodiments, any of the BLs 450 and the PLs 460 of any of the embodiments where a single BL 450 may be electrically continuous among two or more adjacent/nearest nanoribbon stacks 424 may be implemented as any one of those shown in FIGS. 4B-4E. In other words, any combinations of the wrap-around and extend-through versions of any of the BLs 450 and the PLs 460 as those described with reference to FIGS. 4C-4E are possible for the embodiment of FIG. 4F and other similar embodiments.

FIGS. 4B-4F illustrate embodiments of the IC device 401 where a respective one of the WLs 440 is shared (i.e., is electrically continuous) among the nanoribbons 404 of a given level in all of the nanoribbon stacks 424. In other embodiments, different WLs 440 may be shared among different combinations of the nanoribbons 404 of a given level in any of the nanoribbon stacks 424. For example, as shown in FIG. 4G, in some embodiments, a first WL 440-1111 may be electrically continuous among the nanoribbons 404 of a given layer of the first nanoribbon stack 424-1 and the second nanoribbon stack 424-2, while a second WL 440-1112 may be electrically continuous among the nanoribbons 404 of a given layer of the third nanoribbon stack 424-3 and the fourth nanoribbon stack 424-4. FIG. 4G illustrates that the same correspondence of a single WL 440 for different one of the pairs of the nanoribbon stacks 424 may be used for other memory cells 400, e.g., a first WL 440-1121 may be electrically continuous among the nanoribbons 404 of a given layer of the first nanoribbon stack 424-1 and the second nanoribbon stack 424-2, while a second WL 440-1122 may be electrically continuous among the nanoribbons 404 of a given layer of the third nanoribbon stack 424-3 and the fourth nanoribbon stack 424-4. However, in other embodiments, any combination of the embodiments of FIGS. 4B-4E and the embodiment of FIG. 4G may be used. For example, the IC device 401 may include the first and second WLs 440-1111 and 440-1112 as shown in FIG. 4G, but for the memory cells 400-112 to 400-412, a single WL 440-112 as described with reference to FIGS. 4B-4E may be implemented. In further embodiments, although not specifically shown in the present drawings, any combinations of the embodiments described with reference to FIGS. 4C-4F are possible for the embodiment of FIG. 4G and other similar embodiments.

Figure 4H:
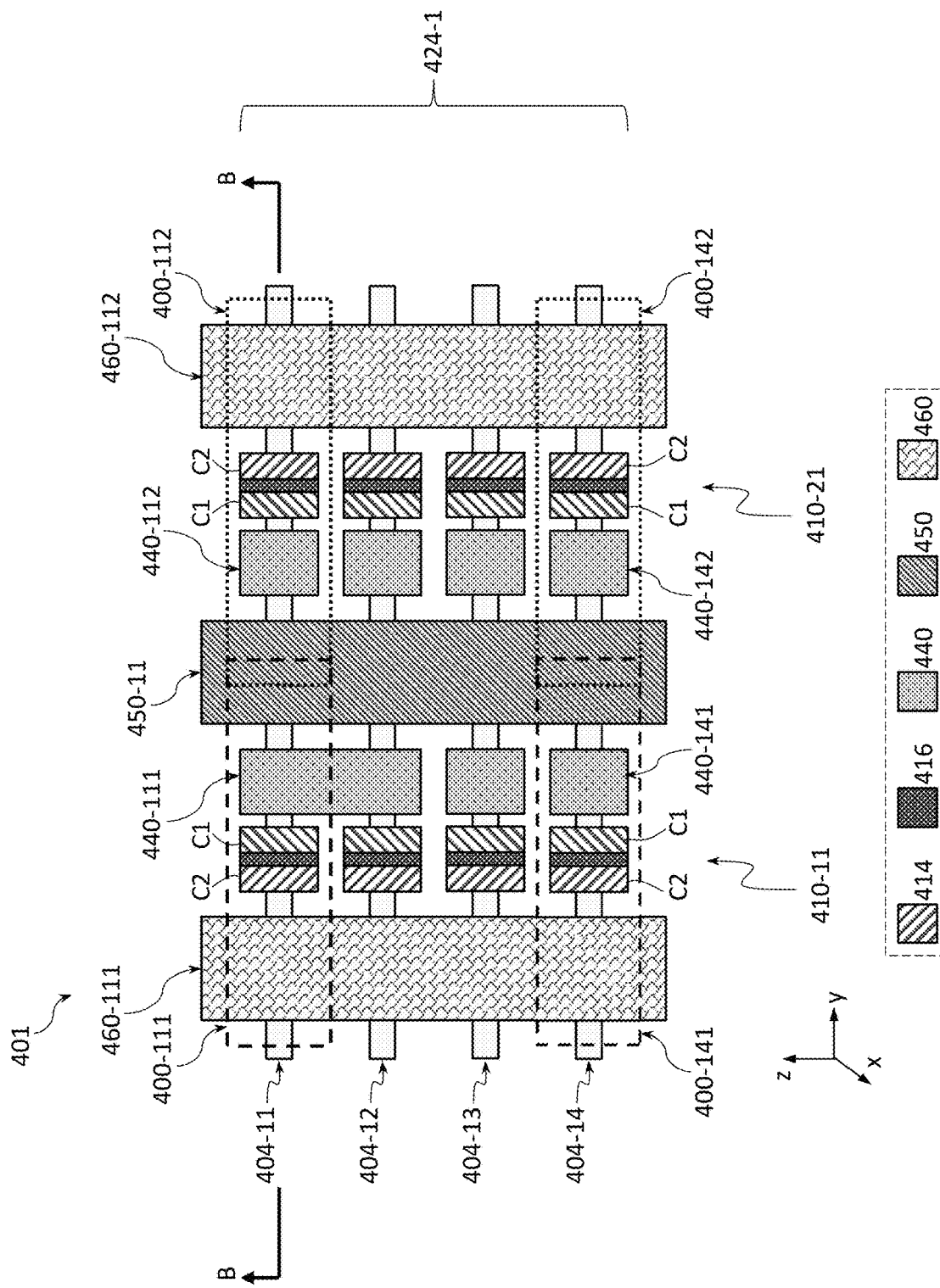

FIGS. 4B-4G illustrate embodiments of the IC device 401 where different ones of the WLs 440 correspond to different levels in all of the nanoribbon stacks 424. In other embodiments, a single WL 440 may be shared among two or more of the adjacent (nearest) levels of any one of the nanoribbon stacks 424. For example, as shown in FIG. 4H, in some embodiments, instead of having the WL 440-111 for the memory cell 400-111 in the first nanoribbon 404-11 of the first nanoribbon stack 424-1 and having another WL for the memory cell 400-121 in the first nanoribbon 404-12 of the first nanoribbon stack 424-1 as shown in FIG. 4A, the WL 440-111 may be shared among the nanoribbons 404-11 and 404-12 of the first nanoribbon stack 424-1. Sharing a single WL 440 among two nanoribbons 404 stacked above one another in a single nanoribbon stack 424 in this manner may advantageously increase the drive current for said memory cells 400. In other embodiments, any combination of the embodiments of FIGS. 4B-4G and the embodiment of FIG. 4H may be used.

Various IC devices 401 illustrated in FIGS. 4A-4H do not represent an exhaustive set of IC devices with 3D nanoribbon-based hysteretic memory as described herein, but merely provide examples of such devices/structures/assemblies. In particular, the number and positions of various elements shown in FIGS. 4A-4H is purely illustrative and, in various other embodiments, other numbers of these elements, provided in other locations relative to one another may be used in accordance with the general architecture considerations described herein. For example, in some embodiments, logic devices, e.g., implemented as/using the transistors 310 or implemented as/using transistors of any other architecture, may be included in any of the IC devices shown in FIGS. 4A-4H, either in the same or separate metal layers from those in which the memory cells are shown.

Although particular arrangements of materials are discussed with reference to FIGS. 3 and 4, intermediate materials may be included in various portions of these figures. Note that FIGS. 3 and 4 are intended to show relative arrangements of some of the components therein, and that various device components of these figures may include other components that are not specifically illustrated, e.g., various interfacial layers or various additional components or layers. Additionally, although some elements of the IC devices are illustrated in FIGS. 3 and 4 as being planar rectangles or formed of rectangular solids, this is simply for ease of illustration, and embodiments of various ones of these elements may be curved, rounded, or otherwise irregularly shaped as dictated by, and sometimes inevitable due to, the manufacturing processes used to fabricate semiconductor device assemblies. Therefore, descriptions of various embodiments of IC devices with 3D nanoribbon-based hysteretic memory, provided herein, are equally applicable to embodiments where various elements of the resulting IC devices look different from those shown in the figures due to manufacturing processes used to form them.

Figure 5:
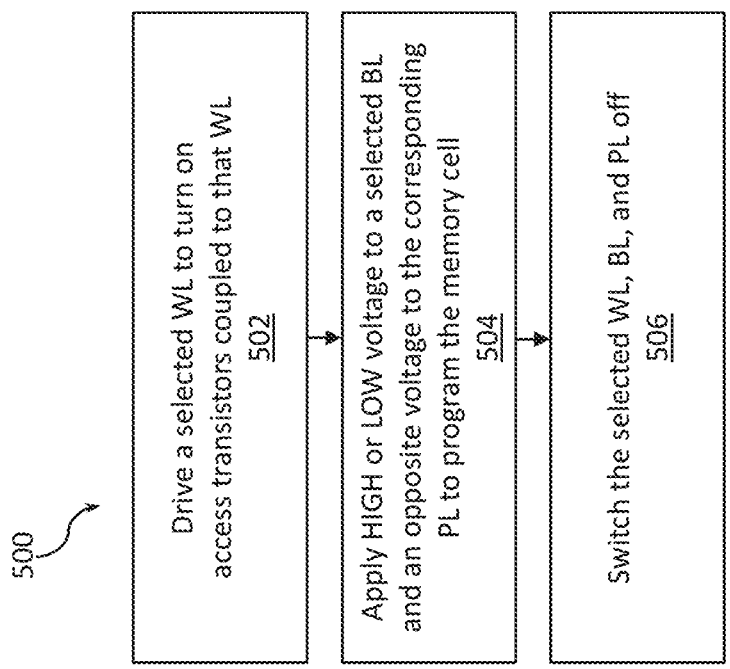
FIG. 5 is a flow diagram of an example method for programming a hysteretic memory cell, according to some embodiments of the present disclosure.

FIG. 5 is a flow diagram of an example method 500 for programming a hysteretic memory cell, according to some embodiments of the present disclosure.

At a process 502 of the method 500, a selected WL 140 coupled to a memory cell 100 may be asserted to turn on the access transistor 102 coupled to that WL. Once the access transistor 102 is switched on, current can flow through it, between the source and the drain terminals of the access transistor.

At a process 504 of the method 500, a HIGH or a LOW voltage may be applied to a BL 150 coupled to the memory cell 100 and an opposite voltage may be applied to a PL 160 coupled to this memory cell to program a logic state by setting the desired polarization state of the hysteretic element 108 in the memory cell 100.

At a process 506 of the method 500, the WL, BL, and PL may be switched off, i.e., de-asserted.

Arrangements with one or more IC devices with 3D nanoribbon-based hysteretic memory as disclosed herein may be included in any suitable electronic device. FIGS. 6-9 illustrate various examples of devices and components that may include one or more IC devices with 3D nanoribbon-based hysteretic memory as disclosed herein.

Figure 6:
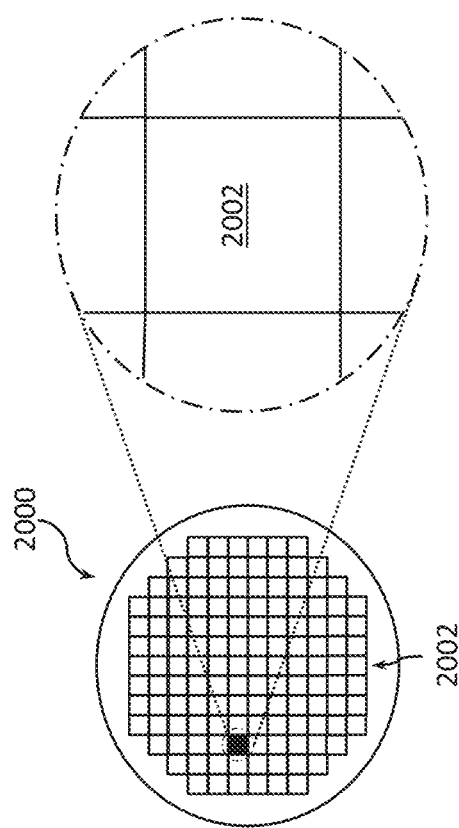
FIG. 6 provides top views of a wafer and dies that may include one or more IC devices with 3D nanoribbon-based hysteretic memory in accordance with any of the embodiments disclosed herein.

FIG. 6 illustrates top views of a wafer 2000 and dies 2002 that may include one or more IC devices with 3D nanoribbon-based hysteretic memory in accordance with any of the embodiments disclosed herein. In some embodiments, the dies 2002 may be included in an IC package, in accordance with any of the embodiments disclosed herein. For example, any of the dies 2002 may serve as any of the dies 2256 in an IC package 2200 shown in FIG. 7. The wafer 2000 may be composed of semiconductor material and may include one or more dies 2002 having IC structures formed on a surface of the wafer 2000. Each of the dies 2002 may be a repeating unit of a semiconductor product that includes any suitable IC (e.g., ICs including one or more IC devices with 3D nanoribbon-based hysteretic memory as described herein). After the fabrication of the semiconductor product is complete (e.g., after manufacture of any embodiment of the IC devices 401 as described herein), the wafer 2000 may undergo a singulation process in which each of the dies 2002 is separated from one another to provide discrete "chips" of the semiconductor product. In particular, devices that include one or more IC devices with 3D nanoribbon-based hysteretic memory as disclosed herein may take the form of the wafer 2000 (e.g., not singulated) or the form of the die 2002 (e.g., singulated). The die 2002 may include supporting circuitry to route electrical signals to various memory cells, transistors, capacitors, as well as any other IC components. In some embodiments, the wafer 2000 or the die 2002 may implement or include a memory device (e.g., a hysteretic memory device), a logic device (e.g., an AND, OR, NAND, or NOR gate), or any other suitable circuit element. Multiple ones of these devices may be combined on a single die 2002. For example, a memory array formed by multiple memory devices may be formed on a same die 2002 as a processing device (e.g., the processing device 2402 of FIG. 9) or other logic that is configured to store information in the memory devices or execute instructions stored in the memory array.

Figure 7:
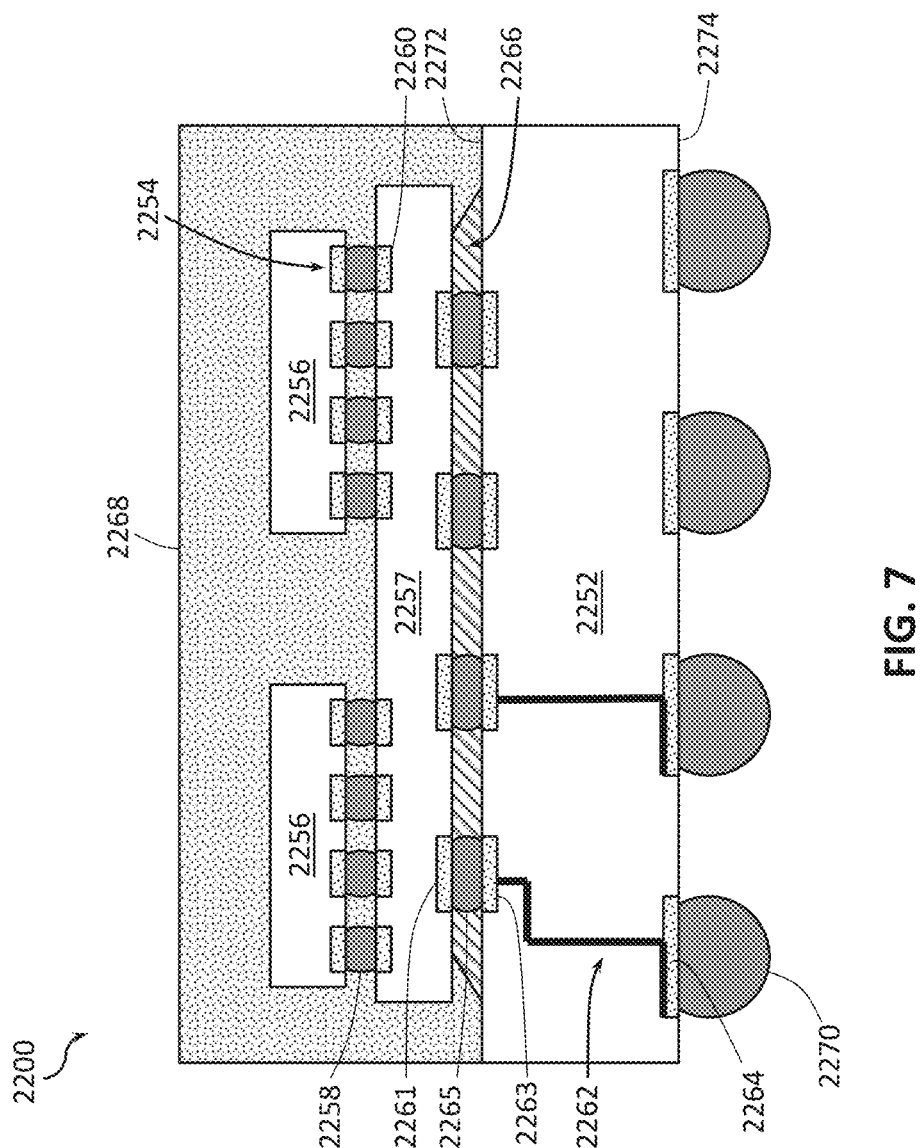
FIG. 7 is a cross-sectional side view of an IC package that may include one or more IC devices with 3D nanoribbon-based hysteretic memory in accordance with any of the embodiments disclosed herein.

FIG. 7 is a side, cross-sectional view of an example IC package 2200 that may include one or more IC devices with 3D nanoribbon-based hysteretic memory in accordance with any of the embodiments disclosed herein. In some embodiments, the IC package 2200 may be a system-in-package (SiP).

The package substrate 2252 may be formed of a dielectric material (e.g., a ceramic, a buildup film, an epoxy film having filler particles therein, etc.), and may have conductive pathways extending through the dielectric material between the face 2272 and the face 2274, or between different locations on the face 2272, and/or between different locations on the face 2274.

The package substrate 2252 may include conductive contacts 2263 that are coupled to conductive pathways 2262 through the package substrate 2252, allowing circuitry within the dies 2256 and/or the interposer 2257 to electrically couple to various ones of the conductive contacts 2264 (or to other devices included in the package substrate 2252, not shown).

The IC package 2200 may include an interposer 2257 coupled to the package substrate 2252 via conductive contacts 2261 of the interposer 2257, first-level interconnects 2265, and the conductive contacts 2263 of the package substrate 2252. The first-level interconnects 2265 illustrated in FIG. 7 are solder bumps, but any suitable first-level interconnects 2265 may be used. In some embodiments, no interposer 2257 may be included in the IC package 2200; instead, the dies 2256 may be coupled directly to the conductive contacts 2263 at the face 2272 by first-level interconnects 2265.

The IC package 2200 may include one or more dies 2256 coupled to the interposer 2257 via conductive contacts 2254 of the dies 2256, first-level interconnects 2258, and conductive contacts 2260 of the interposer 2257. The conductive contacts 2260 may be coupled to conductive pathways (not shown) through the interposer 2257, allowing circuitry within the dies 2256 to electrically couple to various ones of the conductive contacts 2261 (or to other devices included in the interposer 2257, not shown). The first-level interconnects 2258 illustrated in FIG. 7 are solder bumps, but any suitable first-level interconnects 2258 may be used. As used herein, a "conductive contact" may refer to a portion of electrically conductive material (e.g., metal) serving as an interface between different components; conductive contacts may be recessed in, flush with, or extending away from a surface of a component, and may take any suitable form (e.g., a conductive pad or socket).

In some embodiments, an underfill material 2266 may be disposed between the package substrate 2252 and the interposer 2257 around the first-level interconnects 2265, and a mold compound 2268 may be disposed around the dies 2256 and the interposer 2257 and in contact with the package substrate 2252. In some embodiments, the underfill material 2266 may be the same as the mold compound 2268. Example materials that may be used for the underfill material 2266 and the mold compound 2268 are epoxy mold materials, as suitable. Second-level interconnects 2270 may be coupled to the conductive contacts 2264. The second-level interconnects 2270 illustrated in FIG. 7 are solder balls (e.g., for a ball grid array arrangement), but any suitable second-level interconnects 22770 may be used (e.g., pins in a pin grid array arrangement or lands in a land grid array arrangement). The second-level interconnects 2270 may be used to couple the IC package 2200 to another component, such as a circuit board (e.g., a motherboard), an interposer, or another IC package, as known in the art and as discussed below with reference to FIG. 8.

The dies 2256 may take the form of any of the embodiments of the die 2002 discussed herein (e.g., may include any of the embodiments of the IC devices with 3D nanoribbon-based hysteretic memory as described herein). In embodiments in which the IC package 2200 includes multiple dies 2256, the IC package 2200 may be referred to as a multi-chip package (MCP). The dies 2256 may include circuitry to perform any desired functionality. For example, one or more of the dies 2256 may be logic dies (e.g., silicon-based dies), and one or more of the dies 2256 may be memory dies (e.g., high bandwidth memory), including embedded memory dies as described herein.

In some embodiments, any of the dies 2256 may include one or more IC devices with 3D nanoribbon-based hysteretic memory, e.g., as discussed above; in some embodiments, at least some of the dies 2256 may not include any IC devices with 3D nanoribbon-based hysteretic memory.

The IC package 2200 illustrated in FIG. 7 may be a flip chip package, although other package architectures may be used. For example, the IC package 2200 may be a ball grid array (BGA) package, such as an embedded wafer-level ball grid array (eWLB) package. In another example, the IC package 2200 may be a wafer-level chip scale package (WLCSP) or a panel fan-out (FO) package.

Although two dies 2256 are illustrated in the IC package 2200 of FIG. 7, an IC package 2200 may include any desired number of the dies 2256. An IC package 2200 may include additional passive components, such as surface-mount resistors, capacitors, and inductors disposed on the first face 2272 or the second face 2274 of the package substrate 2252, or on either face of the interposer 2257. More generally, an IC package 2200 may include any other active or passive components known in the art.

Figure 8:
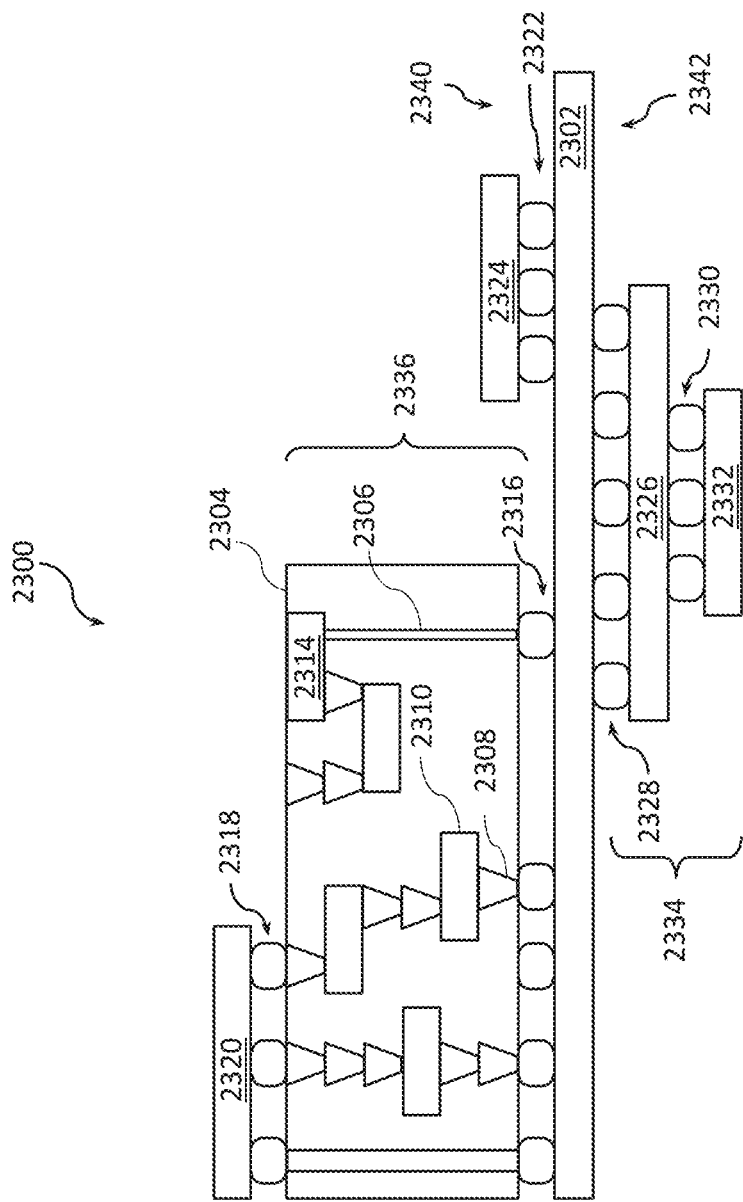
FIG. 8 is a cross-sectional side view of an IC device assembly that may include one or more IC devices with 3D nanoribbon-based hysteretic memory in accordance with any of the embodiments disclosed herein.

FIG. 8 is a cross-sectional side view of an IC device assembly 2300 that may include components having one or more IC devices with 3D nanoribbon-based hysteretic memory in accordance with any of the embodiments disclosed herein. The IC device assembly 2300 includes a number of components disposed on a circuit board 2302 (which may be, e.g., a motherboard). The IC device assembly 2300 includes components disposed on a first face 2340 of the circuit board 2302 and an opposing second face 2342 of the circuit board 2302; generally, components may be disposed on one or both faces 2340 and 2342. In particular, any suitable ones of the components of the IC device assembly 2300 may include any of one or more IC devices with 3D nanoribbon-based hysteretic memory in accordance with any of the embodiments disclosed herein; e.g., any of the IC packages discussed below with reference to the IC device assembly 2300 may take the form of any of the embodiments of the IC package 2200 discussed above with reference to FIG. 7 (e.g., may include one or more IC devices with 3D nanoribbon-based hysteretic memory provided on a die 2256).

In some embodiments, the circuit board 2302 may be a PCB including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 2302. In other embodiments, the circuit board 2302 may be a non-PCB substrate.

The IC device assembly 2300 illustrated in FIG. 8 includes a package-on-interposer structure 2336 coupled to the first face 2340 of the circuit board 2302 by coupling components 2316. The coupling components 2316 may electrically and mechanically couple the package-on-interposer structure 2336 to the circuit board 2302, and may include solder balls (e.g., as shown in FIG. 8), male and female portions of a socket, an adhesive, an underfill material, and/or any other suitable electrical and/or mechanical coupling structure.

The package-on-interposer structure 2336 may include an IC package 2320 coupled to an interposer 2304 by coupling components 2318. The coupling components 2318 may take any suitable form for the application, such as the forms discussed above with reference to the coupling components 2316. The IC package 2320 may be or include, for example, a die (the die 2002 of FIG. 6), an IC device, or any other suitable component. In particular, the IC package 2320 may include one or more IC devices with 3D nanoribbon-based hysteretic memory as described herein. Although a single IC package 2320 is shown in FIG. 8, multiple IC packages may be coupled to the interposer 2304; indeed, additional interposers may be coupled to the interposer 2304. The interposer 2304 may provide an intervening substrate used to bridge the circuit board 2302 and the IC package 2320. Generally, the interposer 2304 may spread a connection to a wider pitch or reroute a connection to a different connection. For example, the interposer 2304 may couple the IC package 2320 (e.g., a die) to a BGA of the coupling components 2316 for coupling to the circuit board 2302. In the embodiment illustrated in FIG. 8, the IC package 2320 and the circuit board 2302 are attached to opposing sides of the interposer 2304; in other embodiments, the IC package 2320 and the circuit board 2302 may be attached to a same side of the interposer 2304. In some embodiments, three or more components may be interconnected by way of the interposer 2304.

The interposer 2304 may be formed of an epoxy resin, a fiberglass-reinforced epoxy resin, a ceramic material, or a polymer material such as polyimide. In some implementations, the interposer 2304 may be formed of alternate rigid or flexible materials that may include the same materials described above for use in a semiconductor substrate, such as silicon, germanium, and other group III-V and group IV materials. The interposer 2304 may include metal interconnects 2308 and vias 2310, including but not limited to through-silicon vias (TSVs) 2306. The interposer 2304 may further include embedded devices 2314, including both passive and active devices. Such devices may include, but are not limited to, capacitors, decoupling capacitors, resistors, inductors, fuses, diodes, transformers, sensors, electrostatic discharge (ESD) protection devices, and memory devices. More complex devices such as radio frequency (RF) devices, power amplifiers, power management devices, antennas, arrays, sensors, and microelectromechanical systems (MEMS) devices may also be formed on the interposer 2304. The package-on-interposer structure 2336 may take the form of any of the package-on-interposer structures known in the art.

The IC device assembly 2300 may include an IC package 2324 coupled to the first face 2340 of the circuit board 2302 by coupling components 2322. The coupling components 2322 may take the form of any of the embodiments discussed above with reference to the coupling components 2316, and the IC package 2324 may take the form of any of the embodiments discussed above with reference to the IC package 2320.

The IC device assembly 2300 illustrated in FIG. 8 includes a package-on-package structure 2334 coupled to the second face 2342 of the circuit board 2302 by coupling components 2328. The package-on-package structure 2334 may include an IC package 2326 and an IC package 2332 coupled together by coupling components 2330 such that the IC package 2326 is disposed between the circuit board 2302 and the IC package 2332. The coupling components 2328 and 2330 may take the form of any of the embodiments of the coupling components 2316 discussed above, and the IC packages 2326 and 2332 may take the form of any of the embodiments of the IC package 2320 discussed above. The package-on-package structure 2334 may be configured in accordance with any of the package-on-package structures known in the art.

Figure 9:
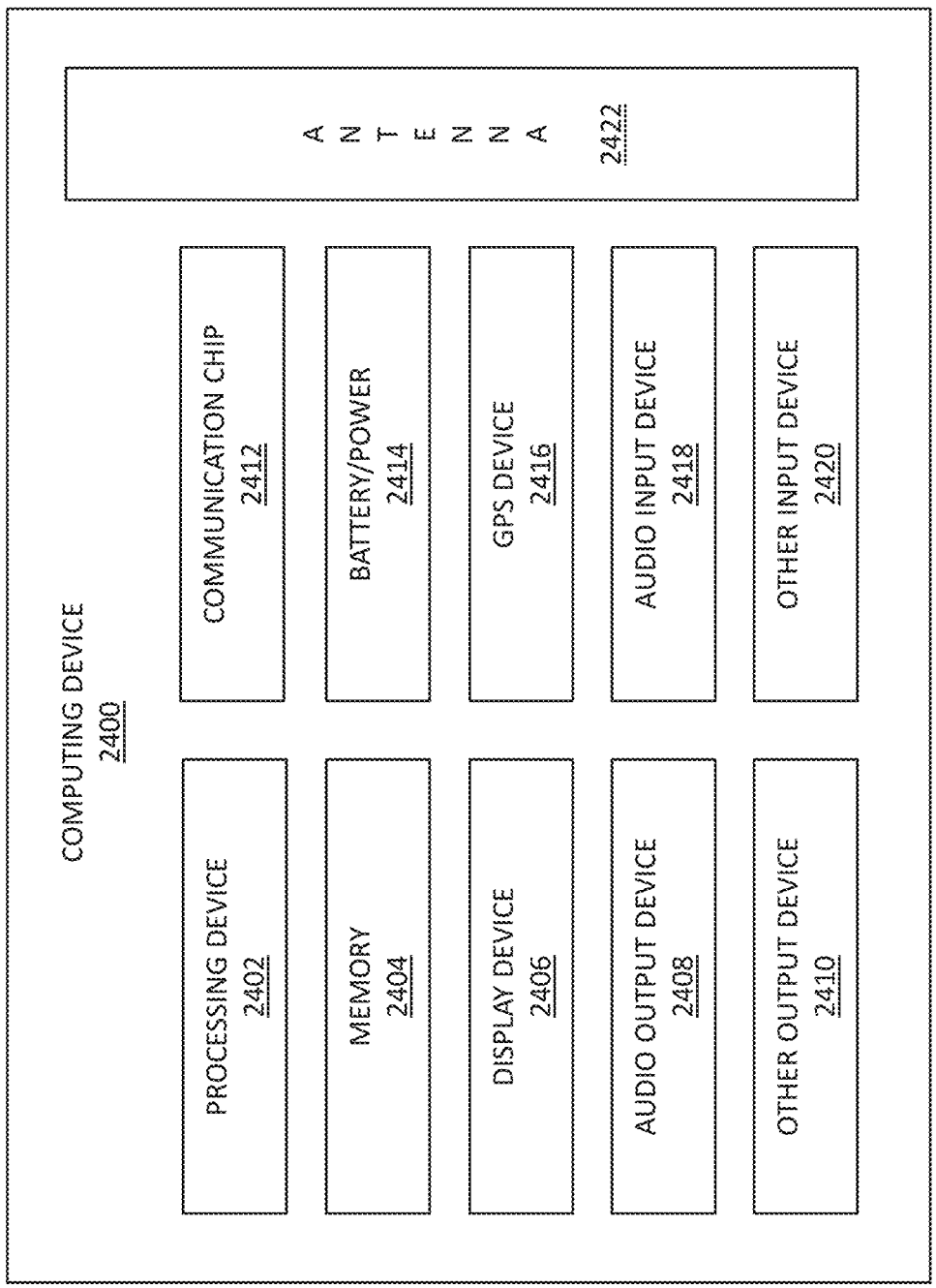
FIG. 9 is a block diagram of an example computing device that may include one or more IC devices with 3D nanoribbon-based hysteretic memory in accordance with any of the embodiments disclosed herein.

FIG. 9 is a block diagram of an example computing device 2400 that may include one or more components with one or more IC devices with 3D nanoribbon-based hysteretic memory in accordance with any of the embodiments disclosed herein. For example, any suitable ones of the components of the computing device 2400 may include a die (e.g., the die 2002 (FIG. 6)) including one or more IC devices with 3D nanoribbon-based hysteretic memory in accordance with any of the embodiments disclosed herein. Any of the components of the computing device 2400 may include an IC package 2200 (FIG. 7). Any of the components of the computing device 2400 may include an IC device assembly 2300 (FIG. 8).

A number of components are illustrated in FIG. 9 as included in the computing device 2400, but any one or more of these components may be omitted or duplicated, as suitable for the application. In some embodiments, some or all of the components included in the computing device 2400 may be attached to one or more motherboards. In some embodiments, some or all of these components are fabricated onto a single SoC die.

Additionally, in various embodiments, the computing device 2400 may not include one or more of the components illustrated in FIG. 9, but the computing device 2400 may include interface circuitry for coupling to the one or more components. For example, the computing device 2400 may not include a display device 2406, but may include display device interface circuitry (e.g., a connector and driver circuitry) to which a display device 2406 may be coupled. In another set of examples, the computing device 2400 may not include an audio input device 2418 or an audio output device 2408 but may include audio input or output device interface circuitry (e.g., connectors and supporting circuitry) to which an audio input device 2418 or audio output device 2408 may be coupled.

The computing device 2400 may include a processing device 2402 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 2402 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 2400 may include a memory 2404, which may itself include one or more memory devices any of which may include volatile memory (e.g., dynamic random-access memory (DRAM)), nonvolatile memory (e.g., read-only memory (ROM)), flash memory, solid state memory, and/or a hard drive. Any of the memory devices of the memory 2404 may include one or more IC devices with 3D nanoribbon-based hysteretic memory as described herein. In some embodiments, the memory 2404 may include memory that shares a die with the processing device 2402. This memory may be used as cache memory and may include embedded hysteretic memory, e.g., one or more IC devices with 3D nanoribbon-based hysteretic memory as described herein.

In some embodiments, the computing device 2400 may include a communication chip 2412 (e.g., one or more communication chips). For example, the communication chip 2412 may be configured for managing wireless communications for the transfer of data to and from the computing device 2400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 2412 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 2412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 2412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 2412 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 2412 may operate in accordance with other wireless protocols in other embodiments. The computing device 2400 may include an antenna 2422 to facilitate wireless communications and/or to receive other wireless communications (such as AM or FM radio transmissions).

In some embodiments, the communication chip 2412 may manage wired communications, such as electrical, optical, or any other suitable communication protocols (e.g., the Ethernet). As noted above, the communication chip 2412 may include multiple communication chips. For instance, a first communication chip 2412 may be dedicated to shorter-range wireless communications such as Wi-Fi or Bluetooth, and a second communication chip 2412 may be dedicated to longer-range wireless communications such as global positioning system (GPS), EDGE, GPRS, CDMA, WiMAX, LTE, EV-DO, or others. In some embodiments, a first communication chip 2412 may be dedicated to wireless communications, and a second communication chip 2412 may be dedicated to wired communications.

The computing device 2400 may include battery/power circuitry 2414. The battery/power circuitry 2414 may include one or more energy storage devices (e.g., batteries or capacitors) and/or circuitry for coupling components of the computing device 2400 to an energy source separate from the computing device 2400 (e.g., AC line power).

The computing device 2400 may include a display device 2406 (or corresponding interface circuitry, as discussed above). The display device 2406 may include any visual indicators, such as a heads-up display, a computer monitor, a projector, a touchscreen display, a liquid crystal display (LCD), a light-emitting diode display, or a flat panel display, for example.

The computing device 2400 may include an audio output device 2408 (or corresponding interface circuitry, as discussed above). The audio output device 2408 may include any device that generates an audible indicator, such as speakers, headsets, or earbuds, for example.

The computing device 2400 may include an audio input device 2418 (or corresponding interface circuitry, as discussed above). The audio input device 2418 may include any device that generates a signal representative of a sound, such as microphones, microphone arrays, or digital instruments (e.g., instruments having a musical instrument digital interface (MIDI) output).

The computing device 2400 may include a GPS device 2416 (or corresponding interface circuitry, as discussed above). The GPS device 2416 may be in communication with a satellite-based system and may receive a location of the computing device 2400, as known in the art.

The computing device 2400 may include an other output device 2410 (or corresponding interface circuitry, as discussed above). Examples of the other output device 2410 may include an audio codec, a video codec, a printer, a wired or wireless transmitter for providing information to other devices, or an additional storage device.

The computing device 2400 may include an other input device 2420 (or corresponding interface circuitry, as discussed above). Examples of the other input device 2420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 2400 may have any desired form factor, such as a handheld or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 2400 may be any other electronic device that processes data.

The following paragraphs provide various examples of the embodiments disclosed herein.

Example 1 provides an IC device that includes a support structure (e.g., a substrate, a wafer, a die, or a chip) and a plurality of memory cells provided over the support structure. In such an IC device an individual memory cell of the plurality of memory cells includes an access transistor having a channel region, a first one of a source region and a drain region (first S/D region) and a second one of the source region and the drain region (second S/D region), and a capacitor having a first capacitor electrode, a second capacitor electrode, and a capacitor insulator, where, in the individual memory cell, at least one of the capacitor insulator and a gate stack of the access transistor includes a hysteretic material or a hysteretic arrangement, and the first capacitor electrode is coupled to the second S/D region. The IC device further includes a wordline, coupled to the channel regions of a first set of two or more memory cells of the plurality of memory cells (i.e., a single wordline forms gates coupled to the channel regions of the first set of memory cells, where the memory cells of such a first set are said to belong to a given "row" of a memory array); a bitline, coupled to the first S/D regions of a second set of two or more memory cells of the plurality of memory cells (i.e., a single bitline is coupled to the first S/D regions of multiple memory cells of the second set of memory cells, where the memory cells of such a second set are said to belong to a given "column" of a memory array); and a plateline, coupled to the second capacitor electrodes of the second set (i.e., a single plateline is coupled to the same set of memory cells to which a single bitline is coupled; thus, memory cells of a given column of a memory array have both a shared bitline and a shared plateline).

Example 2 provides the IC device according to example 1, where the plateline is parallel to the bitline.

Example 3 provides the IC device according to examples 1 or 2, where the plurality of memory cells are nanoribbon-based memory cells and the channel regions of different memory cells of the first set and of the second set are in respective (i.e., different) nanoribbons.

Example 4 provides the IC device according to example 3, where the channel regions of different memory cells of the second set are in respective nanoribbons of a first stack of nanoribbons. Thus, each of the bitline and the plateline coupled to the memory cells of a given column (i.e., the second set of memory cells) may extend across different nanoribbons of a given stack of nanoribbons.

Example 5 provides the IC device according to example 4, where each of the nanoribbons is an elongated structure of a semiconductor material, having a longitudinal axis that is substantially parallel to the support structure, and the bitline is substantially perpendicular to the support structure.

Example 6 provides the IC device according to example 5, where the plateline is substantially perpendicular to the support structure.

Example 7 provides the IC device according to examples 5 or 6, where the wordline is substantially parallel to the support structure.

Example 8 provides the IC device according to any one of examples 4-7, where the bitline is further coupled to the first S/D regions of a third set of two or more memory cells of the plurality of memory cells, the channel regions of different memory cells of the first set, of the second set, and of the third set are in respective (i.e., different) nanoribbons, and the channel regions of different memory cells of the third set are in respective nanoribbons of a second stack of nanoribbons. Thus, a single bitline may be shared among memory cells of two, typically adjacent, nanoribbon stacks. Sharing a bitline in this manner may be advantageous in terms of increasing memory density. Platelines of the first and second nanoribbon stacks may still be separate, i.e., the memory cells of the second set may be coupled to a first plateline, while the memory cells of the third set may be coupled to a second plateline.

Example 9 provides the IC device according to any one of examples 3-4, where the channel regions of different memory cells of the first set are in respective nanoribbons of different stacks of nanoribbons. Thus, the wordline coupled to the memory cells of a given row (i.e., the first set of memory cells) may extend across different stacks of nanoribbons.

Example 10 provides the IC device according to example 9, where the channel regions of different memory cells of the first set are in nanoribbons in a single layer of nanoribbons.

Example 11 provides the IC device according to example 9, where the channel regions of different memory cells of the first set are in nanoribbons in at least two different layers of nanoribbons.

Example 12 provides the IC device according to any one of examples 3-11, where, in the individual memory cell, each of the first capacitor electrode and the second capacitor electrode at least partially wraps around a nanoribbon of the individual memory cell, and the first capacitor electrode is closer to the channel region than the second capacitor electrode.

Example 13 provides the IC device according to any one of examples 1-12, where the hysteretic material includes a ferroelectric (FE) or an antiferroelectric (AFE) material.

Example 14 provides the IC device according to example 13, where the FE or the AFE material includes a material at least 5-10% of which is in an orthorhombic phase or a tetragonal phase (i.e., not more than 90-95% of such a material may be amorphous or in a monoclinic phase), the material including one or more of a material including hafnium, zirconium, and oxygen (e.g., hafnium zirconium oxide), a material including silicon, hafnium, and oxygen (e.g., silicon-doped hafnium oxide), a material including germanium, hafnium, and oxygen (e.g., germanium-doped hafnium oxide), a material including aluminum, hafnium, and oxygen (e.g., aluminum-doped hafnium oxide), a material including yttrium, hafnium, and oxygen (e.g., yttrium-doped hafnium oxide), a material including lanthanum, hafnium, and oxygen (e.g., lanthanum-doped hafnium oxide), a material including gadolinium, hafnium, and oxygen (e.g., gadolinium-doped hafnium oxide), and a material including niobium, hafnium, and oxygen (e.g., niobium-doped hafnium oxide).

Example 15 provides the IC device according to any one of examples 1-14, where the hysteretic arrangement includes a stack of alternating layers of a material that includes silicon and oxygen (e.g., silicon oxide) and a material that includes silicon and nitrogen (e.g., silicon nitride).

Example 16 provides an IC device that includes a support structure (e.g., a substrate, a wafer, a die, or a chip); a first nanoribbon over the support structure; a second nanoribbon, stacked over the first nanoribbon; a first source or drain (S/D) region and a second S/D region in each of the first nanoribbon and the second nanoribbon; a first gate stack, at least partially surrounding a portion of the first nanoribbon between the first S/D region and the second S/D region in the first nanoribbon; a second gate stack, at least partially surrounding a portion of the second nanoribbon between the first S/D region and the second S/D region in the second nanoribbon; a bitline coupled to each of the first S/D region of the first nanoribbon and the first S/D region of the second nanoribbon; a first capacitor and a second capacitor, each including a first capacitor electrode, a second capacitor electrode, and a capacitor insulator between the first and second capacitor electrodes; and a plateline, where at least the first capacitor electrode of the first capacitor at least partially surrounds the second S/D region in the first nanoribbon, at least the first capacitor electrode of the second capacitor at least partially surrounds the second S/D region in the second nanoribbon, and the plateline coupled to each of the second capacitor electrode of the first capacitor and the second capacitor electrode of the second capacitor.

Example 17 provides the IC device according to example 16, where the first gate stack includes a first gate electrode material, the second gate stack includes a second gate electrode material, and at least one of the first gate electrode material and the second gate electrode material is between the first nanoribbon and the second nanoribbon.

Example 18 provides the IC device according to examples 16 or 17, where at least one of the first gate stack, the second gate stack, the capacitor insulator of the first capacitor, and the capacitor insulator of the second capacitor includes a hysteretic material or a hysteretic arrangement.

Example 19 provides the IC device according to example 18, where the hysteretic material includes a ferroelectric (FE) or an antiferroelectric (AFE) material.

Example 20 provides the IC device according to examples 18 or 19, where the hysteretic arrangement includes a stack of at alternating layers of a material that includes silicon and oxygen (e.g., silicon oxide) and a material that includes silicon and nitrogen (e.g., silicon nitride).

Example 21 provides an IC device that includes a support structure (e.g., a substrate, a wafer, a die, or a chip); a memory array that includes a plurality of memory cells implemented in N stacks of nanoribbons provided over the support structure, where an individual stack of the N stacks includes M nanoribbons stacked above one another, where each of N and M is an integer greater than 1; a bitline, coupled to each of a first memory cell and a second memory cell; a plateline, couple to each of the first memory cell and the second memory cell; and a wordline, couple to each of the first memory cell and the third memory cell, where a channel region of an access transistor of the first memory cell is in a first nanoribbon of a first stack of nanoribbons, a channel region of an access transistor of the second memory cell is in a second nanoribbon of the first stack of nanoribbons, and a channel region of an access transistor of the third memory cell is in a first nanoribbon of a second stack of nanoribbons.

Example 22 provides the IC device according to example 21, where each of the first memory cell, the second memory cell, and the third memory cell includes a capacitor having a first capacitor electrode, a second capacitor electrode, and a capacitor insulator, where the access transistor of each of the first memory cell, the second memory cell, and the third memory cell includes a first one of a source region and a drain region (first S/D region) and a second one of the source region and the drain region (second S/D region), where the first capacitor electrode of the capacitor of the first memory cell at least partially wraps around a portion of the first nanoribbon in the first stack that includes the second S/D region of the access transistor of the first memory cell, where the first capacitor electrode of the capacitor of the second memory cell at least partially wraps around a portion of the second nanoribbon in the first stack that includes the second S/D region of the access transistor of the second memory cell, and where the first capacitor electrode of the capacitor of the third memory cell at least partially wraps around a portion of the first nanoribbon in the second stack that includes the second S/D region of the access transistor of the third memory cell.

Example 23 provides the IC device according to example 22, where, in each of the first memory cell, the second memory cell, and the third memory cell, at least one of the capacitor insulator and a gate of the access transistor includes a hysteretic material or a hysteretic arrangement, e.g., any of the hysteretic materials/arrangements according to any one of the preceding examples.

Example 24 provides the IC device according to examples 22 or 23, where the bitline is coupled to each of the first memory cell and the second memory cell by being coupled to the first S/D region of the access transistor of the first memory cell and the first S/D region of the access transistor of the second memory cell.

Example 25 provides the IC device according to any one of examples 22-24, where the wordline is coupled to each of the first memory cell and the third memory cell by forming a gate that at least partially wraps around the channel region of the access transistor of the first memory cell and forming a gate that at least partially wraps around the channel region of the access transistor of the third memory cell.

Example 26 provides an IC package that includes an IC device according to any one of the preceding examples; and a further IC component, coupled to the IC device.

Example 27 provides the IC package according to example 26, where the further component includes one of a package substrate and an interposer.

Example 28 provides the IC package according to example 26, where the further component is a further IC die.

Example 29 provides the IC package according to any one of examples 26-28, where the IC device includes, or is a part of, at least one of a memory device, a computing device, a wearable device, a handheld electronic device, and a wireless communications device.

Example 30 provides an electronic device that includes a carrier substrate; and one or more of the IC device according to any one of the preceding examples and the IC package according to any one of the preceding examples, coupled to the carrier substrate.

Example 31 provides the electronic device according to example 30, where the carrier substrate is a motherboard.

Example 32 provides the electronic device according to example 30, where the carrier substrate is a PCB.

Example 33 provides the electronic device according to any one of examples 30-32, where the electronic device is a wearable electronic device (e.g., a smart watch) or handheld electronic device (e.g., a mobile phone).

Example 34 provides the electronic device according to any one of examples 30-33, where the electronic device further includes one or more communication chips and an antenna.

Example 35 provides the electronic device according to any one of examples 30-34, where the electronic device is an RF transceiver.

Example 36 provides the electronic device according to any one of examples 30-34, where the electronic device is one of a switch, a power amplifier, a low-noise amplifier, a filter, a filter bank, a duplexer, an upconverter, or a downconverter of an RF communications device, e.g., of an RF transceiver.

Example 37 provides the electronic device according to any one of examples 30-34, where the electronic device is a computing device.

Example 38 provides the electronic device according to any one of examples 30-37, where the electronic device is included in a base station of a wireless communication system.

Example 39 provides the electronic device according to any one of examples 30-37, where the electronic device is included in a user equipment device (i.e., a mobile device) of a wireless communication system.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:
1. An integrated circuit (IC) device, comprising:
a plurality of memory cells, wherein an individual memory cell of the plurality of memory cells includes:
a transistor having a channel region, a first region, and a second region, wherein the first region is one of a source region and a drain region of the transistor, and the second region is another one of the source region and the drain region of the transistor, and
a capacitor having a first capacitor electrode, a second capacitor electrode, and a capacitor insulator,
wherein, in the individual memory cell, at least one of the capacitor insulator and a gate stack of the transistor includes a hysteretic material or a hysteretic arrangement, the first capacitor electrode is coupled to the second region, each of the first capacitor electrode and the second capacitor electrode at least partially wraps around a nanoribbon of the individual memory cell, and the first capacitor electrode is closer to the channel region than the second capacitor electrode;
a first conductive line, coupled to the channel regions of a first set of two or more memory cells of the plurality of memory cells;
a second conductive line, coupled to the first regions of a second set of two or more memory cells of the plurality of memory cells; and
a third conductive line, coupled to the second capacitor electrodes of the second set.

2. The IC device according to claim 1, wherein the third conductive line is parallel to the second conductive line.

3. The IC device according to claim 1, wherein the plurality of memory cells are nanoribbon-based memory cells and the channel regions of different memory cells of the first set and of the second set are in respective nanoribbons.

4. The IC device according to claim 3, wherein the channel regions of different memory cells of the second set are in respective nanoribbons of a first stack of nanoribbons.

5. The IC device according to claim 4, further comprising a substrate, wherein:
the plurality of memory cells are over the substrate,
each of the nanoribbons is an elongated structure of a semiconductor material, having a longitudinal axis that is substantially parallel to the substrate, and
the second conductive line is substantially perpendicular to the substrate.

6. The IC device according to claim 5, wherein the third conductive line is substantially perpendicular to the substrate.

7. The IC device according to claim 5, wherein the first conductive line is substantially parallel to the substrate.

8. The IC device according to claim 4, wherein:
the second conductive line is further coupled to the first regions of a third set of two or more memory cells of the plurality of memory cells,
the channel regions of different memory cells of the first set, of the second set, and of the third set are in respective nanoribbons, and
the channel regions of different memory cells of the third set are in respective nanoribbons of a second stack of nanoribbons.

9. The IC device according to claim 3, wherein the channel regions of different memory cells of the first set are in respective nanoribbons of different stacks of nanoribbons.

10. The IC device according to claim 9, wherein the channel regions of different memory cells of the first set are in nanoribbons in a single layer of nanoribbons.

11. The IC device according to claim 9, wherein the channel regions of different memory cells of the first set are in nanoribbons in at least two different layers of nanoribbons.

12. The IC device according to claim 1, wherein the hysteretic material includes a ferroelectric (FE) or an antiferroelectric (AFE) material.

13. The IC device according to claim 12, wherein the FE or the AFE material includes a material at least 5% of which is in an orthorhombic phase or a tetragonal phase, the material including one or more of:
a material including hafnium, zirconium, and oxygen,
a material including silicon, hafnium, and oxygen,
a material including germanium, hafnium, and oxygen,
a material including aluminum, hafnium, and oxygen,
a material including yttrium, hafnium, and oxygen,
a material including lanthanum, hafnium, and oxygen,
a material including gadolinium, hafnium, and oxygen, and
a material including niobium, hafnium, and oxygen.

14. The IC device according to claim 1, wherein the hysteretic arrangement includes a stack of alternating layers of a material that includes silicon and oxygen and a material that includes silicon and nitrogen.

15. An integrated circuit (IC) device, comprising:
a first nanoribbon;
a second nanoribbon stacked over the first nanoribbon;
a first region and a second region in each of the first nanoribbon and the second nanoribbon, wherein, in each of the first nanoribbon and the second nanoribbon, one of the first region and the second region is a source region and another one of the first region and the second region is a drain region;
a first gate stack at least partially surrounding a portion of the first nanoribbon between the first region and the second region in the first nanoribbon;
a second gate stack at least partially surrounding a portion of the second nanoribbon between the first region and the second region in the second nanoribbon;
a first conductive line coupled to each of the first region of the first nanoribbon and the first region of the second nanoribbon;
a first capacitor and a second capacitor, each including a first capacitor electrode, a second capacitor electrode, and a capacitor insulator between the first and second capacitor electrodes, wherein the first capacitor electrode of the first capacitor at least partially surrounds the second region in the first nanoribbon, and the first capacitor electrode of the second capacitor at least partially surrounds the second region in the second nanoribbon; and
a second conductive line coupled to the second capacitor electrode of the first capacitor and the second capacitor electrode of the second capacitor.

16. The IC device according to claim 15, wherein:
the first gate stack includes a first gate electrode material,
the second gate stack includes a second gate electrode material, and
at least one of the first gate electrode material and the second gate electrode material is between the first nanoribbon and the second nanoribbon.

17. The IC device according to claim 15, wherein at least one of the first gate stack, the second gate stack, the capacitor insulator of the first capacitor, and the capacitor insulator of the second capacitor includes a hysteretic material or a hysteretic arrangement.

18. An integrated circuit (IC) device, comprising:
a support structure;
N stacks of nanoribbons over the support structure, wherein an individual stack of the N stacks includes M nanoribbons stacked above one another, where each of N and M is an integer greater than 1;
a bitline coupled to each of a first memory cell and a second memory cell;
a plateline coupled to each of the first memory cell and the second memory cell; and
a wordline coupled to each of the first memory cell and a third memory cell,
wherein:
a channel region of a transistor of the first memory cell is in a first nanoribbon of a first stack of nanoribbons,
a channel region of a transistor of the second memory cell is in a second nanoribbon of the first stack of nanoribbons, a channel region of a transistor of the third memory cell is in a first nanoribbon of a second stack of nanoribbons, each of the first memory cell, the second memory cell, and the third memory cell includes a capacitor having a first capacitor electrode, a second capacitor electrode, and a capacitor insulator, the transistor of each of the first memory cell, the second memory cell, and the third memory cell includes a first one of a source region and a drain region (first region) and a second one of the source region and the drain region (second region), the first capacitor electrode of the capacitor of the first memory cell at least partially wraps around a portion of the first nanoribbon in the first stack that includes the second region of the transistor of the first memory cell, the first capacitor electrode of the capacitor of the second memory cell at least partially wraps around a portion of the second nanoribbon in the first stack that includes the second region of the transistor of the second memory cell, and the first capacitor electrode of the capacitor of the third memory cell at least Partially wraps around a portion of the first nanoribbon in the second stack that includes the second region of the transistor of the third memory cell.

19. The IC device according to claim 18, wherein a distance between the support structure and the first nanoribbon of the first stack of nanoribbons is substantially equal to a distance between the support structure and the first nanoribbon of the second stack of nanoribbons.

20. The IC device according to claim 18, wherein the capacitor insulator includes a hysteretic material or a hysteretic arrangement.

* * * * *

UNITED STATES PATENT AND TRADEMARK OFFICE
CERTIFICATE OF CORRECTION

| | | |
|---|---|---|
| PATENT NO. | : 12,471,288 B2 | Page 1 of 1 |
| APPLICATION NO. | : 17/543809 | |
| DATED | : November 11, 2025 | |
| INVENTOR(S) | : Wilfred Gomes et al. | |

It is certified that error appears in the above-identified patent and that said Letters Patent is hereby corrected as shown below:

In the Claims

In Column 38, Claim 18, Line 5, delete "Partially" and insert -- partially --, therefor.

Signed and Sealed this
Thirteenth Day of January, 2026

John A. Squires
*Director of the United States Patent and Trademark Office*